(12) United States Patent
Beers

(10) Patent No.: US 12,423,333 B2
(45) Date of Patent: Sep. 23, 2025

(54) DATA PROCESSING FOR VISUALIZING HIERARCHICAL DATA

(71) Applicant: Tableau Software, LLC, Seattle, WA (US)

(72) Inventor: Andrew C Beers, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/370,367

(22) Filed: Jul. 8, 2021

(65) Prior Publication Data

US 2023/0008999 A1 Jan. 12, 2023

(51) Int. Cl.
G06F 16/28 (2019.01)
G06F 16/22 (2019.01)
G06F 16/242 (2019.01)

(52) U.S. Cl.
CPC ........ G06F 16/287 (2019.01); G06F 16/2246 (2019.01); G06F 16/2282 (2019.01); G06F 16/2425 (2019.01); G06F 16/244 (2019.01)

(58) Field of Classification Search
CPC .............. G06F 16/287; G06F 16/2246; G06F 16/2282; G06F 16/2425; G06F 16/244
USPC ........................................................ 707/737
See application file for complete search history.

(56) References Cited

U.S. PATENT DOCUMENTS

| | | | |
|---|---|---|---|
| 5,550,971 A | 8/1996 | Brunner et al. | |
| 5,689,711 A * | 11/1997 | Bardasz | G06F 8/34 715/964 |
| 8,286,087 B1 | 10/2012 | Xian et al. | |
| 9,383,913 B2 | 7/2016 | Hoyer et al. | |
| 9,489,119 B1 | 11/2016 | Smith, Jr. | |
| 9,760,240 B2 | 9/2017 | Maheshwari et al. | |
| 9,881,066 B1 | 1/2018 | Yousaf et al. | |
| 10,275,265 B1 | 4/2019 | Gould et al. | |
| 10,445,170 B1 | 10/2019 | Subramanian et al. | |
| 10,698,955 B1 | 6/2020 | Broecheler | |

(Continued)

FOREIGN PATENT DOCUMENTS

WO 2006060773 A2 6/2006

OTHER PUBLICATIONS

Office Communication for U.S. Appl. No. 16/586,554 mailed Feb. 24, 2022, pp. 1-47.

(Continued)

Primary Examiner — Giovanna B Colan
(74) Attorney, Agent, or Firm — Morgan, Lewis & Bockius LLP

(57) ABSTRACT

Embodiments are directed to managing visualizations of data. A provided data model may include a tree specification that declares parent-child relationships between objects in the data model. In response to a query associated with objects in the data model: employing the parent-child relationships to determine a tree that includes parent objects and child objects from the objects based on the parent-child relationships; determining a root object based on the query and the tree; traversing the tree from the root object to visit the child objects in the tree; determining partial results based on characteristics of the visited child objects such that the partial results are stored in an intermediate table; and providing a response to the query that includes values based on the intermediate table and the partial results.

20 Claims, 15 Drawing Sheets

(56) References Cited

U.S. PATENT DOCUMENTS

| | | |
|---|---|---|
| 10,705,695 B1 | 7/2020 | Porath et al. |
| 10,783,162 B1 | 9/2020 | Montague et al. |
| 2004/0205562 A1 | 10/2004 | Rozek et al. |
| 2006/0064674 A1 | 3/2006 | Olson, Jr. et al. |
| 2008/0126987 A1 | 5/2008 | Meschian et al. |
| 2009/0006939 A1 | 1/2009 | DeSpain et al. |
| 2009/0007122 A1 | 1/2009 | Peyton et al. |
| 2009/0012983 A1 | 1/2009 | Senneville et al. |
| 2010/0114629 A1 | 5/2010 | Adler et al. |
| 2010/0138420 A1 | 6/2010 | Bator et al. |
| 2010/0235771 A1 | 9/2010 | Gregg, III |
| 2010/0313157 A1 | 12/2010 | Carlsson et al. |
| 2010/0318583 A1 | 12/2010 | Cohen |
| 2011/0219321 A1 | 9/2011 | Gonzalez Veron et al. |
| 2012/0311497 A1 | 12/2012 | Bear et al. |
| 2014/0026084 A1 | 1/2014 | Gilboa |
| 2014/0058789 A1 | 2/2014 | Doehring et al. |
| 2014/0074888 A1 | 3/2014 | Potter et al. |
| 2014/0114907 A1 | 4/2014 | Kozina et al. |
| 2014/0215405 A1 | 7/2014 | Breedvelt-Schouten |
| 2014/0267287 A1 | 9/2014 | Dodgen et al. |
| 2014/0330821 A1 | 11/2014 | Tullis et al. |
| 2014/0372956 A1 | 12/2014 | Bisca et al. |
| 2015/0112998 A1 | 4/2015 | Shankar et al. |
| 2015/0339263 A1 | 11/2015 | Abu El Ata et al. |
| 2015/0347091 A1 | 12/2015 | Ferko et al. |
| 2016/0078361 A1* | 3/2016 | Brueckner .............. H04L 67/10 706/12 |
| 2016/0103908 A1 | 4/2016 | Fletcher et al. |
| 2016/0224532 A1 | 8/2016 | Miller et al. |
| 2016/0224616 A1 | 8/2016 | Beacom et al. |
| 2016/0232207 A1* | 8/2016 | Brunel .................. G06F 16/282 |
| 2016/0314605 A1 | 10/2016 | Filippi et al. |
| 2017/0010787 A1 | 1/2017 | Ranganathan et al. |
| 2017/0075557 A1 | 3/2017 | Noble et al. |
| 2017/0091317 A1 | 3/2017 | Cummings et al. |
| 2017/0102694 A1 | 4/2017 | Enver et al. |
| 2017/0103103 A1 | 4/2017 | Nixon et al. |
| 2017/0140068 A1 | 5/2017 | Oh et al. |
| 2017/0154088 A1 | 6/2017 | Sherman |
| 2017/0161188 A1 | 6/2017 | Isoi |
| 2017/0177681 A1 | 6/2017 | Potiagalov et al. |
| 2017/0177744 A1 | 6/2017 | Potiagalov et al. |
| 2017/0178368 A1 | 6/2017 | Noon et al. |
| 2017/0193049 A1 | 7/2017 | Grehant |
| 2017/0213131 A1 | 7/2017 | Hammond et al. |
| 2017/0220633 A1 | 8/2017 | Porath et al. |
| 2017/0286526 A1* | 10/2017 | Bar-Or ...................... G06F 8/34 |
| 2017/0293666 A1* | 10/2017 | Ragavan ............. G06F 16/9024 |
| 2017/0316355 A1 | 11/2017 | Shrestha et al. |
| 2018/0024731 A1 | 1/2018 | Sanches et al. |
| 2018/0067998 A1 | 3/2018 | Sherman et al. |
| 2018/0129369 A1 | 5/2018 | Kim et al. |
| 2018/0157702 A1 | 6/2018 | Clemens et al. |
| 2018/0218050 A1 | 8/2018 | Porath et al. |
| 2018/0260106 A1 | 9/2018 | Leonard et al. |
| 2018/0260903 A1 | 9/2018 | Callery |
| 2019/0034489 A1 | 1/2019 | Ziegler |
| 2019/0095395 A1 | 3/2019 | Piecko |
| 2019/0188308 A1 | 6/2019 | Simon et al. |
| 2019/0286668 A1 | 9/2019 | Puzicha et al. |
| 2019/0294720 A1 | 9/2019 | Beringer et al. |
| 2019/0325292 A1 | 10/2019 | Remis et al. |
| 2019/0332599 A1 | 10/2019 | Woo |
| 2019/0384836 A1 | 12/2019 | Roth et al. |
| 2020/0104401 A1* | 4/2020 | Burnett .................. G06F 16/287 |
| 2020/0104402 A1 | 4/2020 | Burnett et al. |
| 2020/0175006 A1 | 6/2020 | Hughes |
| 2020/0285803 A1 | 9/2020 | Edge et al. |
| 2020/0334277 A1 | 10/2020 | Doyle et al. |
| 2020/0372057 A1 | 11/2020 | Tonkin et al. |
| 2020/0401623 A1 | 12/2020 | Dilts et al. |
| 2021/0263900 A1 | 8/2021 | Joyce et al. |
| 2021/0390420 A1 | 12/2021 | Barnett |
| 2022/0113150 A1 | 4/2022 | Hidayat et al. |

OTHER PUBLICATIONS

Office Communication for U.S. Appl. No. 16/984,014 mailed Mar. 18, 2022, pp. 1-5.
Office Communication for U.S. Appl. No. 16/944,043 mailed Apr. 19, 2022, pp. 1-10.
Office Communication for U.S. Appl. No. 16/984,014 mailed Apr. 20, 2022, pp. 1-33.
Pienta, Robert et al., "VISAGE: Interactive Visual Graph Querying," AVI '16, Jun. 7-10, 2016, Bari Italy, pp. 272-279.
Von Landesberger, Tatiana et al., "A System for Interactive Visual Analysis of Large Graphs Using Motifs in Graph Editing and Aggregation, " VMV 2009, pp. 1-9.
Office Communication for U.S. Appl. No. 16/586,554 mailed Jul. 24, 2020, pp. 1-27.
Office Communication for U.S. Appl. No. 16/586,554 mailed Nov. 24, 2020, pp. 1-28.
Office Communication for U.S. Appl. No. 16/586, 554 mailed Feb. 16, 2021, pp. 1-7.
Office Communication for U.S. Appl. No. 16/586,554 mailed Apr. 2, 2021, pp. 1-37.
Office Communication for U.S. Appl. No. 16/725,986 mailed Apr. 2, 2021, pp. 1-23.
Papenbrock, Thorsten et al., "Data-driven Schema Normalization," In Proceedings of the 20th International Conference on Extending Database Technology, 2017, pp. 342-353.
Brunel, Robert et al., "Supporting Hierarchical Data in SAP HANA," 2015 IEEE 31st International Conference on Data Engineering (ICDE), 2015, pp. 1-12.
Office Communication for U.S. Appl. No. 17/091,536 mailed Apr. 25, 2022, pp. 1-32.
Office Communication for U.S. Appl. No. 17/091,536 mailed Jul. 7, 2022, pp. 1-5.
Office Communication for U.S. Appl. No. 17/091,536 mailed Aug. 16, 2022, pp. 1-38.
Gillis, Alexander S. et al., "What is integrated development environment (IDE)?—Definition from WhatIs.com," Sep. 2018, TechTarget, https://www.techtarget.com/searchsoftwarequality/definition/integrated-development-environment, Accessed: Aug. 16, 2022, pp. 1-4.
Office Communication for U.S. Appl. No. 16/586,554 mailed Aug. 17, 2022, pp. 1-56.
Office Communication for U.S. Appl. No. 16/984,014 mailed Aug. 10, 2021, pp. 1-32.
Furmanova, Katarina et al., "Taggle: Scalable Visualization of Tabular Data through Aggregation," IEEE Transactions on Visualization and Computer Graphics, 2017, pp. 1-14.
Office Communication for U.S. Appl. No. 16/586,554 mailed Sep. 27, 2021, pp. 1-45.
Office Communication for U.S. Appl. No. 16/725,986 mailed Sep. 30, 2021, pp. 1-10.
Office Communication for U.S. Appl. No. 17/091,536 mailed Nov. 5, 2021, pp. 1-25.
Office Communication for U.S. Appl. No. 16/944,043 mailed Nov. 26, 2021, pp. 1-49.
Office Communication for U.S. Appl. No. 16/586,554 mailed Dec. 15, 2021, pp. 1-7.
Office Communication for U.S. Appl. No. 16/984,014 mailed Jan. 3, 2022, pp. 1-31.
International Search Report and Written Opinion for International Patent Application No. PCT/US2022/034283 mailed Oct. 27, 2022, pp. 1-12.
Office Communication for U.S. Appl. No. 16/586,554 mailed Nov. 21, 2022, pp. 1-6.
Office Communication for U.S. Appl. No. 17/535,465 mailed Jun. 8, 2023, pp. 1-7.
Office Communication for U.S. Appl. No. 17/409,299 mailed Jun. 28, 2023, pp. 1-36.
International Search Report and Written Opinion for International Patent Application No. PCT/US2020/028163 mailed Jul. 21, 2020, pp. 1-7.
Office Communication for U.S. Appl. No. 16/389,389 mailed May 13, 2021, pp. 1-16.

(56) References Cited

OTHER PUBLICATIONS

Office Communication for U.S. Appl. No. 16/389,389 mailed Aug. 18, 2021, pp. 1-9.
International Search Report and Written Opinion for International Patent Application No. PCT/US2022/031195 mailed Aug. 31, 2022, pp. 1-12.
Office Communication for U.S. Appl. No. 17/542,148 mailed Oct. 27, 2022, pp. 1-14.
International Search Report and Written Opinion for International Patent Application No. PCT/US2022/038328 mailed Nov. 30, 2022, pp. 1-12.
Office Communication for U.S. Appl. No. 17/409,299 mailed Feb. 14, 2023, pp. 1-28.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Numbers of Shortcuts," in Proceedings of the Fourteenth Annual ACM-SIAM Symposium on Discrete Algorithms, Jan. 2003, pp. 665-669.
Office Communication for U.S. Appl. No. 17/542,148 mailed Feb. 17, 2023, pp. 1-8.
Office Communication for U.S. Appl. No. 17/542,148 mailed Feb. 28, 2023, pp. 1-2.
Office Communication for U.S. Appl. No. 17/091,536 mailed Mar. 10, 2023, pp. 1-10.
Office Communication for U.S. Appl. No. 17/091,536 mailed Mar. 16, 2023, pp. 1-3.
Office Communication for U.S. Appl. No. 16/586,554 mailed Jan. 5, 2023, pp. 1-24.

\* cited by examiner

DATA PROCESSING FOR VISUALIZING HIERARCHICAL DATA

TECHNICAL FIELD

The present invention relates generally to data visualization, and more particularly, but not exclusively to visualizing hierarchical information

BACKGROUND

Organizations are generating and collecting an ever-increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, the quantity of data may make it difficult to effectively utilize the collected data to improve business practices. In some cases, organizations may generate visualizations of the some or all of their data. Employing visualizations to represent this data may enable organizations to improve their understanding of critical business operations and help them monitor key performance indicators. In some cases, organizations may desire to employ visualizations for visualizing hierarchical data using trees or tree-like visualizations. Further, aggregation semantics of hierarchical data may be well suited for representing as trees or tree-like visualizations. Accordingly, tree-like visualizations may include collapse-expand features that are consistent with hierarchical data aggregation semantics. However, in some cases effectively leveraging hierarchical data aggregation semantic to provide visualizations may be difficult depending on the arrangement of the underlying data store. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
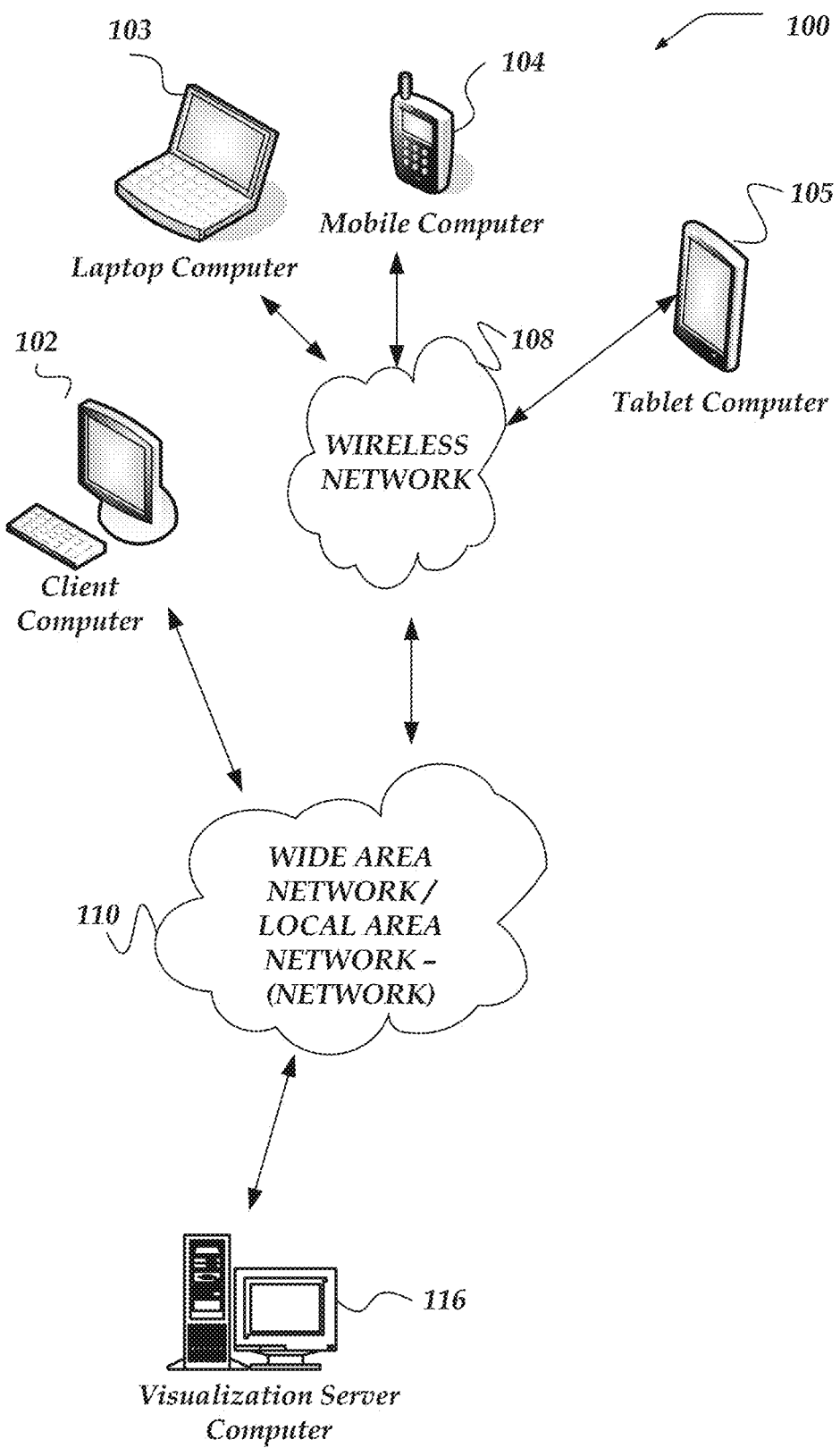
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "tree view" refers to a visualization that displays data using a tree-like format. Interactive tree views may be arranged to follow one or more tree-like user interface semantics, such as, parent-child grouping, level hierarchies, expanding tree nodes to show included nodes or leaves, or the like.

As used herein the term "tree model" refers to information a modeling engine or visualization engine may employ to define or declare the hierarchical relationships that may be in a one or more data sources or data models. Tree models may declare or define one or more relationships between one or more data objects in a data model. Thus, in some cases, tree models may be considered part of a data model.

As used herein the term "tree-view specification," or "tree specification" refers to information a visualization engine may employ to determine the displayed data, display formatting, styling, or the like, of a tree view. In some cases, tree-view specifications may represent the display state of an interactive tree-view. For example, in some cases, tree-specification may specify which nodes of the tree are expanded or collapsed.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data. In one or more of the various embodiments, a data model and a tree specification may be provided such that the tree specification declares one or more parent-child relationships between two or more objects in the data model.

In one or more of the various embodiments, the one or more parent-child relationships may be employed to determine a tree that includes one or more parent objects and one or more child objects from the one or more objects based on the one or more parent-child relationships.

In one or more of the various embodiments, one or more root objects may be determined based on the tree such that the one or more root objects are parent objects that correspond to a root node of one or more portions of the tree.

In one or more of the various embodiments, the tree may be traversed from the one or more root objects to visit the one or more child objects in the one or more portions of the tree.

In one or more of the various embodiments, one or more partial results may be determined based on one or more characteristics of the one or more visited child objects such that the one or more partial results are aggregated and stored in an intermediate table.

In one or more of the various embodiments, in response to a query associated with one or more objects in the data model, a response to the query that includes one or more values based on the intermediate table and the one or more partial results may be provided.

In one or more of the various embodiments, storing the one or more partial results in the intermediate table may include: determining one or more values for each parent object and each child object associated with the query based on the one or more characteristics of the one or more visited child objects and the query; generating one or more records for each parent object and each child object associated with the query such that each record includes an identifier that corresponds to parent object or a child object and a value that corresponds to a partial result; and, in some embodiments, storing the one or more records in the intermediate table.

In one or more of the various embodiments, the data source may include a plurality of records of information arranged in one or more tables.

In one or more of the various embodiments, determining the tree may include determining one or more nodes and one or more edges based on the data model and the one or more parent-child relationships such that the one or more nodes of the tree correspond to the one or more parent objects or the one or more child objects and such that the one or more edges of the tree correspond to the one or more parent-child relationships.

In one or more of the various embodiments, providing the subsequent response to the subsequent query may include: determining the intermediate table based on the data model and the subsequent query; iterating through one or more records in the intermediate table based on the subsequent query; generating one or more other values based on the iteration through the one or more records and the other query; and generating the subsequent response based on the one or more other values.

In one or more of the various embodiments, a tree view based on the one or more values included in the response to the query may be displayed. And, in response to one or more user interactions with the tree view that expand or collapse a node in the tree view that corresponds to a parent object, performing further actions, including: updating the query based on the expanded or collapsed node; generating one or more other partial results based on updated query; updating the intermediate table based on the one or more partial results; generating another response to the query that includes one or more other values based on the updated query and the updated intermediate table; and updating the displayed tree view based on the one or more other values.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110.

Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
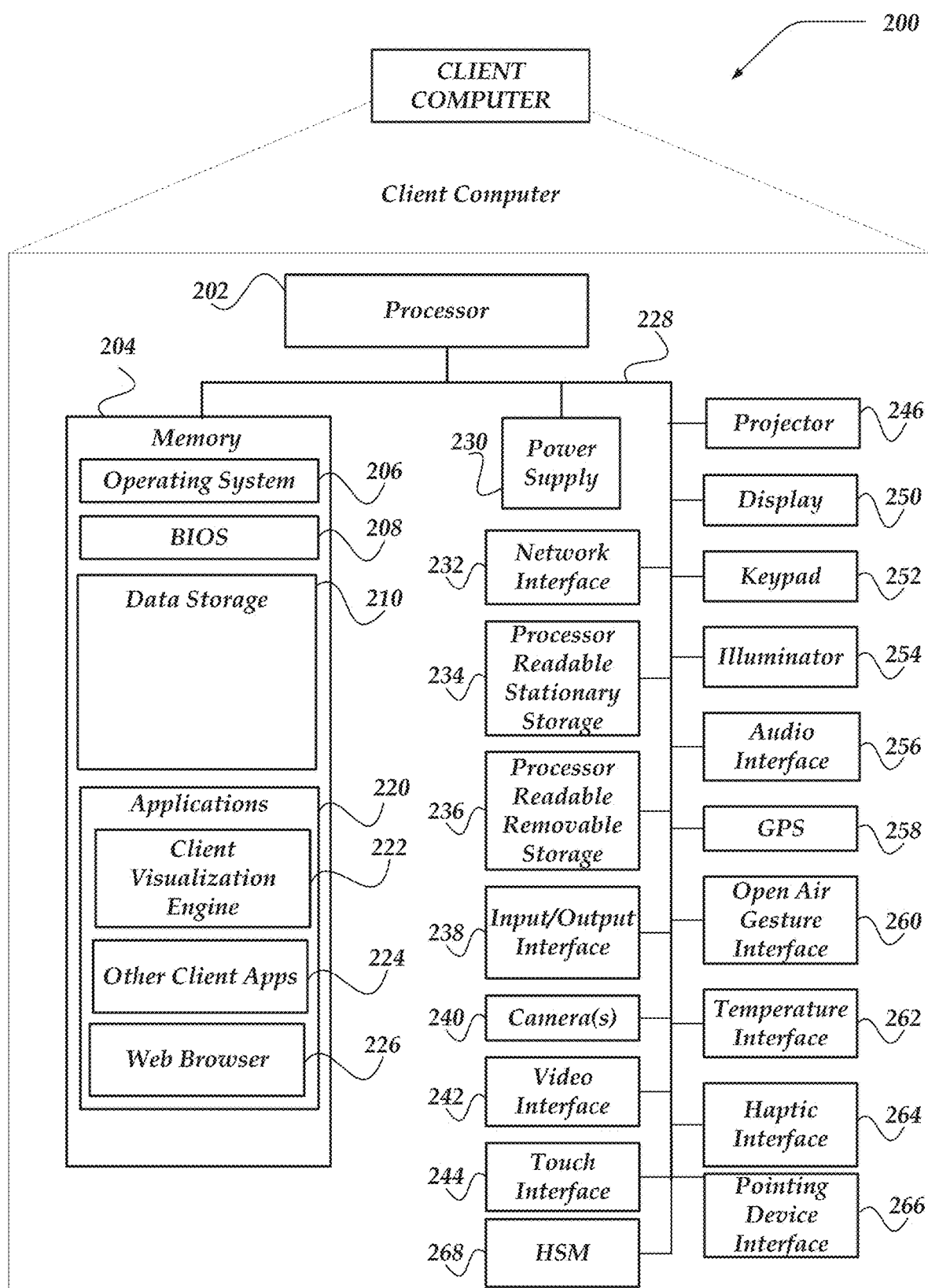
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
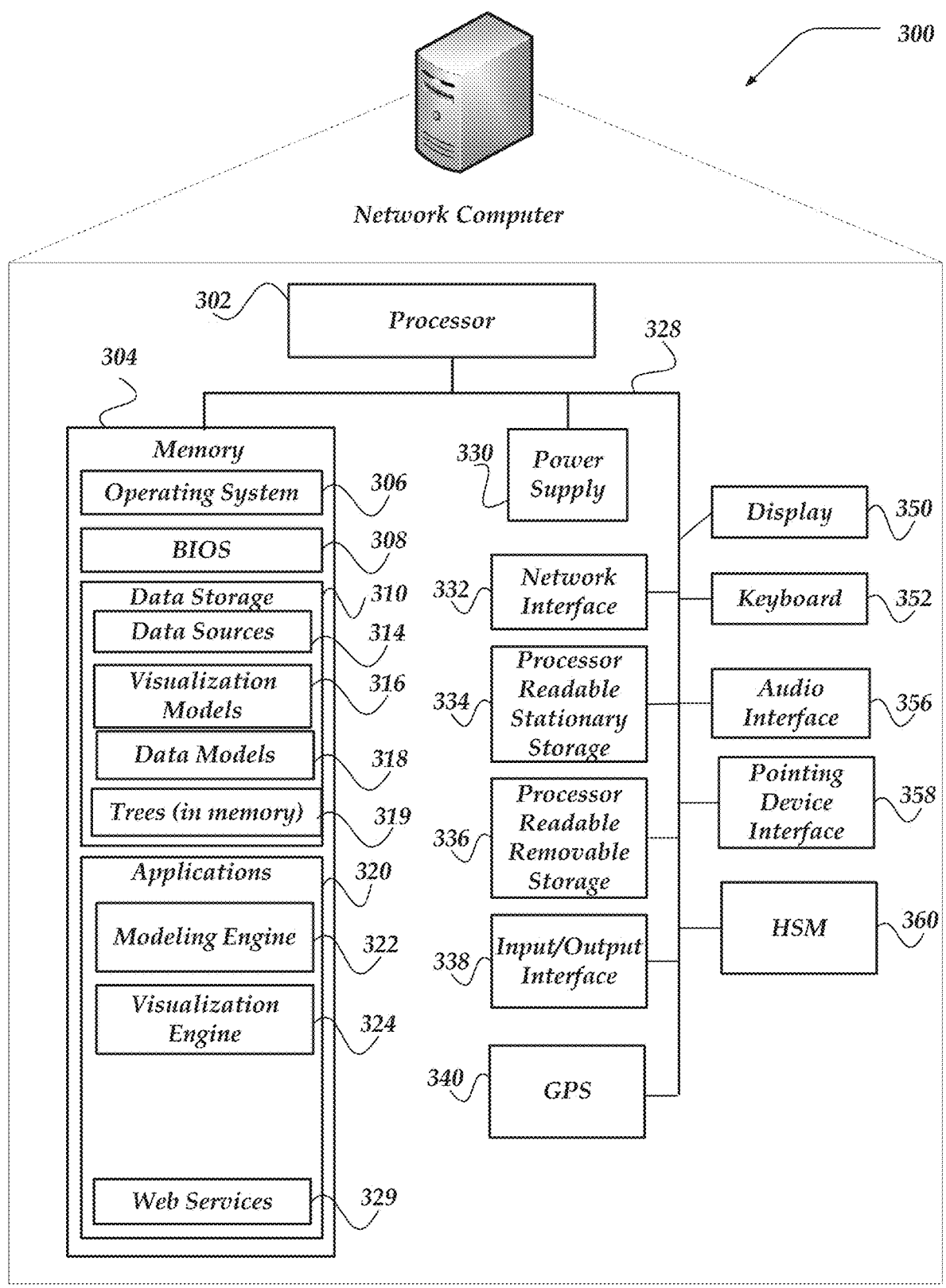
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows operating system, or Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, visualization models 316, data models 318, trees (in-memory) 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, other applications 329, other applications 329, or the like, may be operative in a cloud-based computing environment. In one or more of the various embodiments, these applications, and others, that comprise a visualization platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, other applications 329, or the like, may be provisioned and de-commissioned automatically.

Also, in one or more of the various embodiments, modeling engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
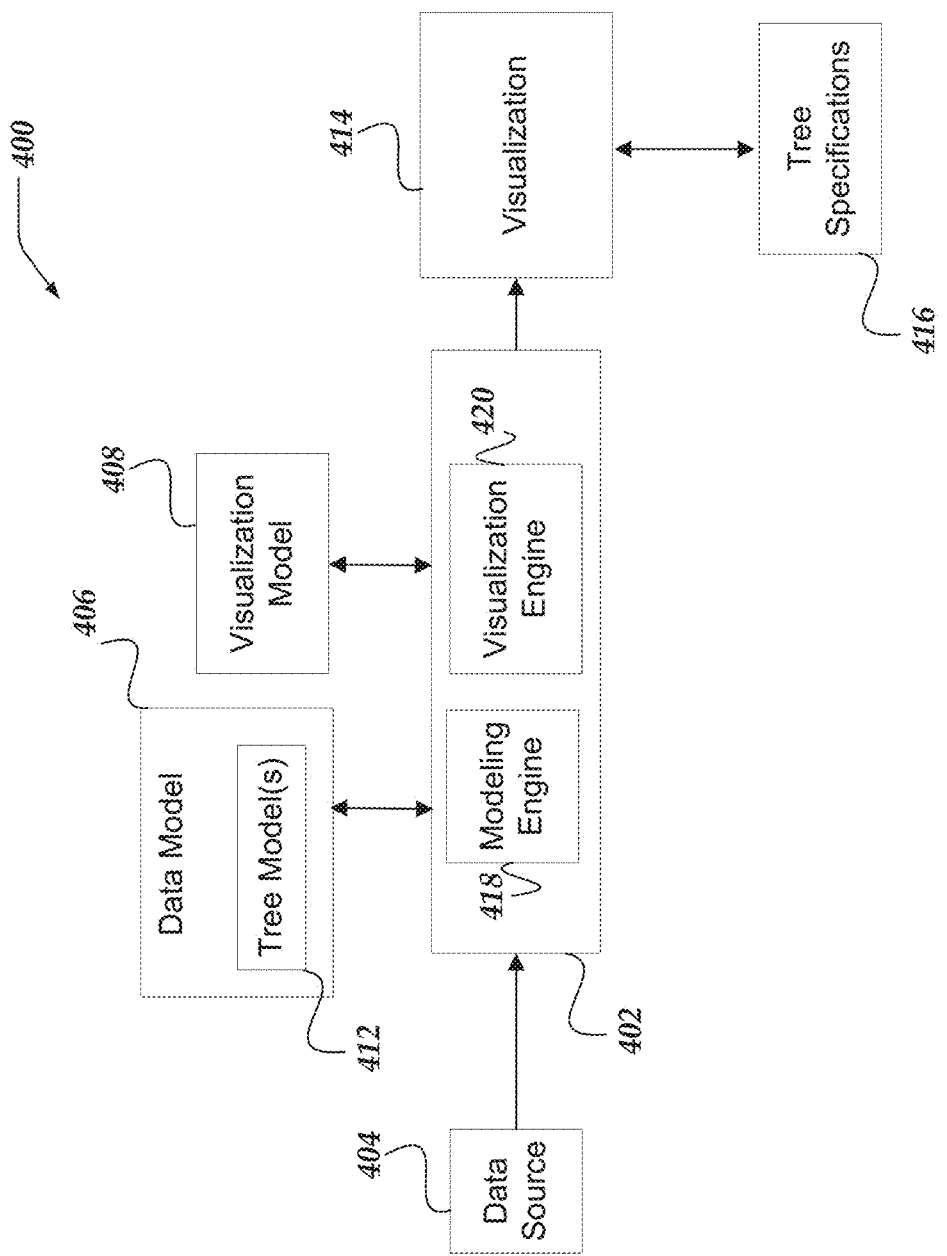
FIG. 4 illustrates a logical architecture of a system for data processing for visualizing hierarchical data in accordance with one or more of the various embodiments.

FIG. 4 illustrates a logical architecture of system 400 for data processing for visualizing hierarchical data in accordance with one or more of the various embodiments. In one or more of the various embodiments, system 400 may be a visualization platform arranged to include various components including: visualization server 402; one or more data sources, such as, data source 404; one or more data models, such as, as data model 406, one or more visualization models, such as, visualization model 408; one or more tree models, such as, tree models 412; one or more visualizations, such as, visualization 414; one or more tree specifications, such as, tree specification 416; one or more modeling engines, such as, modeling engine 418; one or more visualization engines, such as, visualization engine 420; or the like.

In one or more of the various embodiments, visualization servers, such as, visualization server 402 may be arranged to generate one or more visualizations, such as, visualization 414. In some embodiments, visualization server 402 may be arranged to obtain information from data sources, such as, data source 404. Accordingly, in some embodiments, some or all of the information provided by data source 404 may be mapped to or otherwise extracted and transformed into one or more of one or more data models or visualization models. Thus, in some embodiments, visualization servers may be arranged to generate one or more visualizations, such as, visualization 414 based the data models or visualization models.

In some embodiments, a modeling engine, such as, modeling engine 418 may be employed to transform some or all of information provided by data source 404 into one or more data models, such as, data model 406. In some embodiments, the modeling engine may be arranged to employ or execute computer readable instructions provided by configuration information to determine some or all of the steps for transforming information provided by data sources into data models.

In one or more of the various embodiments, configuration information, including user input, may be employed to select one or more portions of the information provided by data sources to transform into a data model.

In one or more of the various embodiments, visualization models may be comprised of one or more display objects. In some embodiments, display objects may represent a visualization or partial visualization of the data associated with one or more data objects. The particular visualization expressed by a display object may be selected based the composition (e.g., data type, properties, number of items, semantic meaning, or the like) of a given data object. In some embodiments, a data object may be associated with more than one display object, each representing a different visualization of the given data object. Accordingly, display objects may be arranged to represent different common, uncommon, or custom, visualization elements, such as, line plots, surface plots, bar charts, pie charts, tables, text fields, text areas, or the like, that may be included in visualizations to provide improved understanding of data. In some embodiments, visualizations may be targeted for different audiences, such as, customers, stakeholders, internal teams, business intelligence teams, or the like. Accordingly, more than one visualization model may be generated or associated with the same data model.

Figure 5:
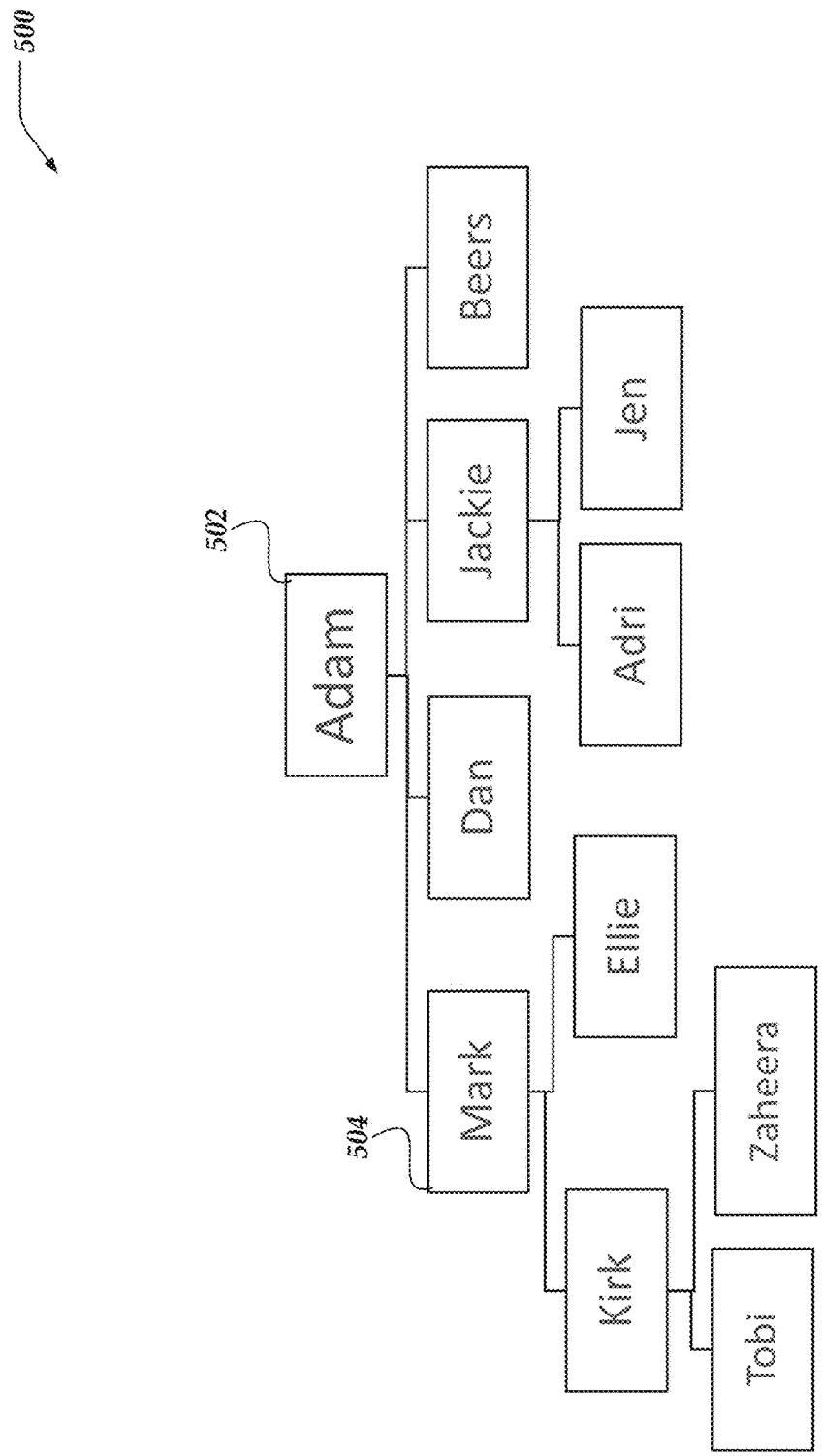
FIG. 5 illustrates a logical representation of a data tree for data processing for visualizing hierarchical data in accordance with one or more of the various embodiments.

Further, in one or more of the various embodiments, modeling engines, such as, modeling engine 418 may be arranged to enable data processing for visualizing hierarchical data. In some embodiments, tree-like visualizations may be visualizations that include one or more features that may be commonly associated with trees, such as, expand-collapse semantics, parent-child depictions, nodes, root nodes, branches/edges. or the like. Also, in some embodiments, one or more tree-like visualizations may include features/values based on hierarchical relationships declared in data models even though they may not appear tree-like when displayed to a user. Thus, in some embodiments, tree-like visualizations may look like trees as shown in FIG. 5 or they may be lists, charts, tables, fields, or the like, that may not look like conventional trees even though they may be based on hierarchical relationships.

In one or more of the various embodiments, data models, such as, data model 406 may include one or more tree models, such as, tree model(s) 412. In some embodiments, tree models may be the one or more portions of the data model that declare or define hierarchical relationships, or the like, that may exist between some or all the data objects in a data model.

In some embodiments, in some cases, modeling engines may be arranged to automatically generate tree models based on the underlying data sources. For example, if the data source explicitly supports hierarchical structures (e.g., graph databases, object-oriented databases, or the like), modeling engines may be arranged to automatically generate tree models from the data source. However, in some embodiments, modeling engines may be arranged to enable visualization authors to define/declare hierarchical relationships between data objects as part of defining data models.

Accordingly, in some embodiments, if a data model includes tree models, visualization authors may be enabled to design visualization models that incorporate some or all of the hierarchical relationships declared in the relevant data models. In some embodiments, modeling engines or visualization engines may be arranged to automatically determine if user interfaces (e.g., menu items, controls, toolbox items, or the like) for including tree visualization features may be presented to users based on the presence of tree models in the data models being employed by visualization authors or visualization users.

Accordingly, in one or more of the various embodiments, modeling engines or visualization engines may be arranged to employ one or more tree models, such as, tree models 412 to generate tree visualizations.

In one or more of the various embodiments, as mentioned, in some cases, some data sources may not natively support hierarchical relationships. Thus, in some embodiments, tree models may be declared to enable visualization engines to determine hierarchical relationships of data that may be stored in non-hierarchical data structures, such as, tables. Accordingly, in one or more of the various embodiments, visualization engines may be arranged to generate one or more intermediate values or datasets to facilitate aggregation of hierarchical data. As described below, in some embodiments, visualization engines may be arranged to generate one or more intermediate tables to temporarily store information computed that supports the visualization of aggregates of hierarchical information. In one or more of the various embodiments, visualization engines may be arranged to include or reference one or more data structures, such as, intermediate tables in a tree specification data structure, such as, tree specification(s) 416.

Further, in some embodiments, visualization engines may be arranged to enable visualization authors to create interactive visualizations. In some embodiments, interactive visualizations may include one or more features or user interfaces that enable users/viewers to exploit tree semantics to explore the underlying data. For example, for some embodiments, tree-like visualizations may be arranged to support expand or collapse actions associated the hierarchical relationships declared in tree models. Accordingly, in some embodiments, visualization engines may be arranged to employ tree specifications, such as, tree specifications 416 to track or represent state of tree visualizations. For example, in some embodiments, tree specifications may be employed to track which tree view nodes are expanded or which nodes may be collapsed.

FIG. 5 illustrates a logical representation of data tree 500 for data processing for visualizing hierarchical data in accordance with one or more of the various embodiments.

In some circumstances, information or data may be reasoned about using trees or tree-like structures. Accordingly, various social or commercial relationships may be naturally suitable for reasoning or visualizing as trees. In this example, tree 500 may be considered to represent employees and their relationships with each other in an organization. In this example, each node of tree 500 corresponds to an employee. Employees that are responsible for manning other employees are associated with parent nodes that have child nodes where the manager employee is associated with the parent node and the reporting employees are associated with child nodes. In this example, employee Adam (node 502) directly manages four other employees (Mark, Dan, Jackie, and Beers). Accordingly, in this example, employee Mark (node 504) reports to employee Adam (node 502). However, in this example, employee Mark (node 504) also manages two employees (Kirk and Ellie). Similarly, employee Jackie has two reporting employees (Adri and Jen), and so on. Accordingly, in this example tree 500 clearly shows the employee hierarchy of the organization.

Figure 6:
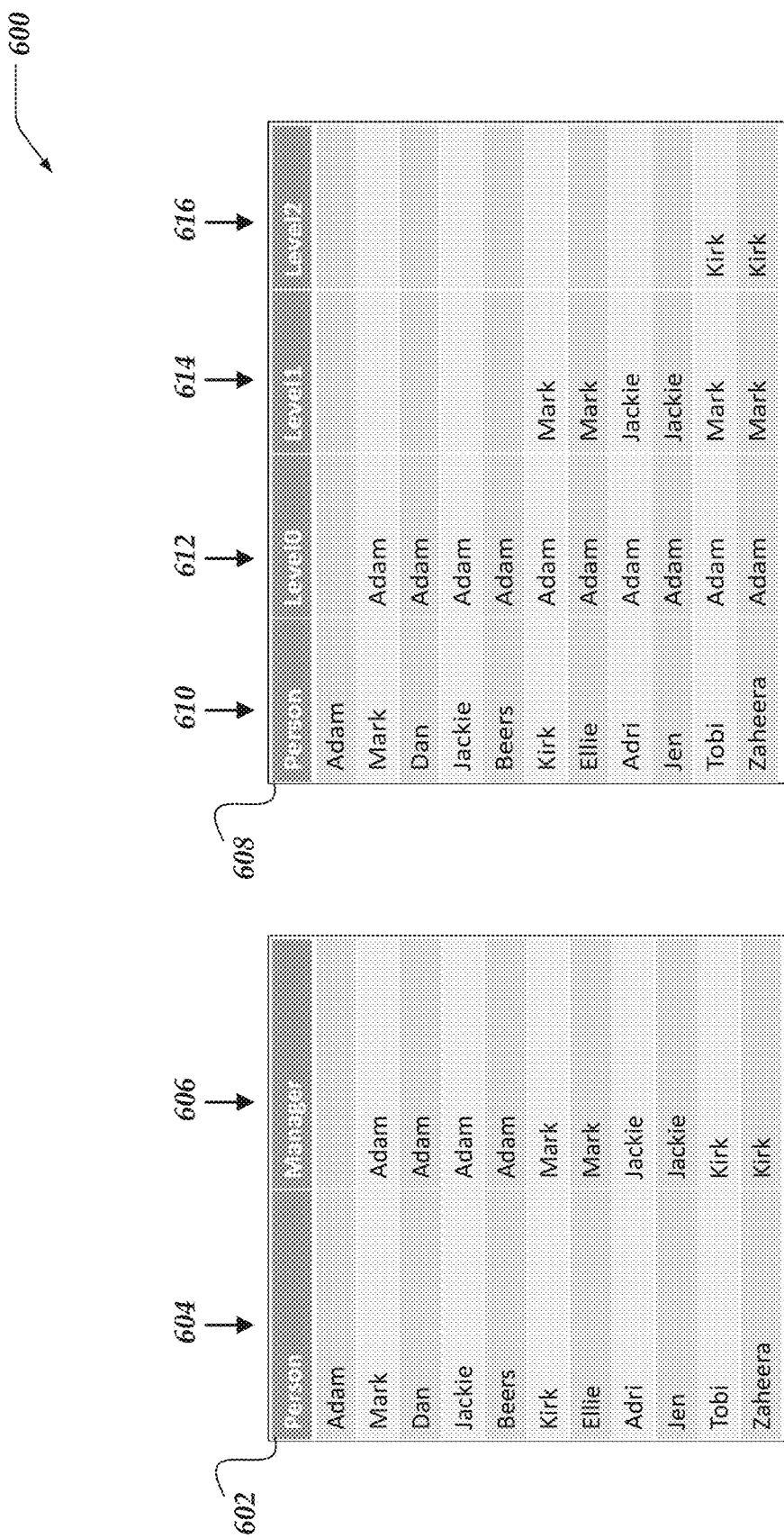
FIG. 6 illustrates a logical representation of a data structures for storing hierarchical data in accordance with one or more of the various embodiments.

FIG. 6 illustrates a logical representation of data structures 600 for storing hierarchical data in accordance with one or more of the various embodiments. In one or more of the various embodiments, various data structures may be arranged to represent hierarchical information. Accordingly, in some embodiments, data sources may be arranged store information such that the hierarchical relationships may be preserved. However, often conventional data stores may employ data structures, such as, tables, to represent hierarchical information using rows and columns. Typically, rows may represent instances of objects and column fields in a given row may represent properties or attributes of the object instances. Thus, because of an absence of native or natural facilities to represent hierarchy, table-based data stores may be arranged to include column fields that may be used to represent hierarchical information. In some embodiments, hierarchical relationships among objects may be inferred from the column fields or column field values. In other embodiments, tables may be arranged to include columns that may explicitly encode hierarchy relationships.

Accordingly, in this example, table 602 and table 608 demonstrate two ways to represent hierarchical relationships in table data structures. Note, one of ordinary skill in the art will appreciate that hierarchical information or hierarchical relationships may be represented using a variety of data structures, tables, or database schemas. In some cases, visualization engines may be arranged to infer hierarchical structure directly from the data structures or the data itself. In other cases, data models may include one or more tree models that may explicitly declare the relevant hierarchical relationships. For example, in some embodiments, a visualization platform may provide one or more user interfaces that enable visualization authors to explicitly declare the relevant hierarchical relationships that may be included in tree models.

For example, in one or more of the various embodiments, data source tables such as table 602 may be arranged to include one or more column fields that may implicitly define or represent hierarchical relationships. For example, table 602 includes Person column 604 and Manager column 606. In this example, column 604 identifies a person and column 606 identifies that person's direct manager. Note, the values in table 602 correspond with tree 500 described above. Thus, in some embodiments, even though table 602 is not a tree or tree-like data structure it includes information that may be represented as a tree.

Also, in one or more of the various embodiments, data source tables such as table 608 may be arranged to include one or more column fields that explicitly represent tree information. In this example, table 608 includes Person column 610 that identifies an employee while Level 0 column 612, Level 1 column 614, Level 2 column 616 represent hierarchical relationships of the employees. In this example, each depth level of tree 500 is represented a separate column. In this example, each node in tree 500 may be explicitly represented in table 608 by including the tree-path information for each employee in each employee record. Accordingly, in this example, column 612, column 614, and column 616 for employee Adam are empty because Adam corresponds to the root of the tree. Further, each other employed in table 608 has level column values that correspond to their position in the hierarchy.

In one or more of the various embodiments, visualization engines may be arranged to execute or respond to queries to generate values that may be displayed in visualizations. In some embodiments, visualization engines may be arranged to generate one or more values associated with aggregate values in data sources or data models.

Also, in one or more of the various embodiments, visualization engines may be arranged to display one or more visualizations that include one or more visualization objects based on or derived from aggregate information. For example, a simple bar chart that compared the total number of employees and the total number of managers in an organization may be easily generated from table 602. In this example, such a bar chart could include one bar scaled to represent the eleven employees and another bar scaled to represent four managers. Note, this visualization would not include or represent the hierarchical relationships of the employees. Rather it provides a visualization that illustrates the number of employees in the organization and the number of employees in the organization that manage at least one other employee. Generating visualizations that may represent hierarchical relationships may require specialized processing that may be unavailable to conventional visualization engines.

Accordingly, in some embodiments, visualization engines may be arranged to automatically generate one or more supporting data structures for providing aggregate values associated with hierarchical information.

In one or more of the various embodiments, modeling engines may be arranged to enable visualization authors to define information that may be included in tree-view specifications. In one or more of the various embodiments, tree-view specification may be information a visualization engine may employ to determine the data, formatting, styling, or the like, of a tree view.

In one or more of the various embodiments, the information included in tree specifications may vary depending on how the source data may be organized in the data source. Also, in some embodiments, the information included in tree specifications may vary depending on the visualization objects a visualization author may include in a visualization.

In one or more of the various embodiments, modeling engines may be arranged to enable users to define data models that include one or more tree models that model the one or more hierarchical relationships that may be present in the source data. For example, in some embodiments, modeling engines may be arranged to provide user interfaces that enable users to explicitly identify the data fields or data objects that have hierarchical relationships.

Also, in one or more of the various embodiments, modeling engines may be arranged to employ one or more rules, instructions, heuristics, or the like, to automatically analyze source data to identify one or more hierarchical relationships. In one or more of the various embodiments, modeling engines may be arranged to display or otherwise provide the one or more hierarchical relationships to a user. Accordingly, in some embodiments, users may be enabled to confirm or otherwise identify which hierarchical relationships may be valid or relevant. For example, for some embodiments, modeling engines may be arranged to identify column fields that may be referencing the same type of object such as column 604 and column 606 in table 602 and present them as potential hierarchical relationships.

Also, for example, in one or more of the various embodiments, modeling engines may be arranged to enable visualization objects, such as, "tree-views" to be added to visualizations. Accordingly, in some embodiments, if a visualization author adds a tree-view to a visualization, the modeling engine may be arranged to request or require additional input from the author to identify the hierarchical relationships for the tree-view. In some embodiments, if a user adds a tree-view to a visualization, the modeling engine may be arranged to require one or more tables or other data objects to be selected and the relevant hierarchical relationships to be identified. For example, for some embodiments, if a user is adding a tree-view based on table 602 to a visualization, the modeling engine may enable the user to identify column 606 as including parents of the objects in column 604. Accordingly, in this example, the modeling engine may be enabled to generate tree models that can produce tree visualizations, such as, tree 500.

Likewise, in some embodiments, if the source data may be arranged similar to table 608, the modeling engines may be arranged to enable users to identify which columns correspond to different levels of the tree.

In one or more of the various embodiments, modeling engines may be arranged to validate that tree models defined automatically or by users actually have characteristics of tree graphs. For example, in some embodiments, modeling engines may be arranged to validate the child nodes in a tree have one parent, and so on. In some embodiments, modeling engines may be arranged to warn users that tree models they are defining may not result in valid trees. In some embodiments, modeling engines may be arranged to employ rules, instructions, or the like provided via configuration information to validate tree models.

Figure 7:
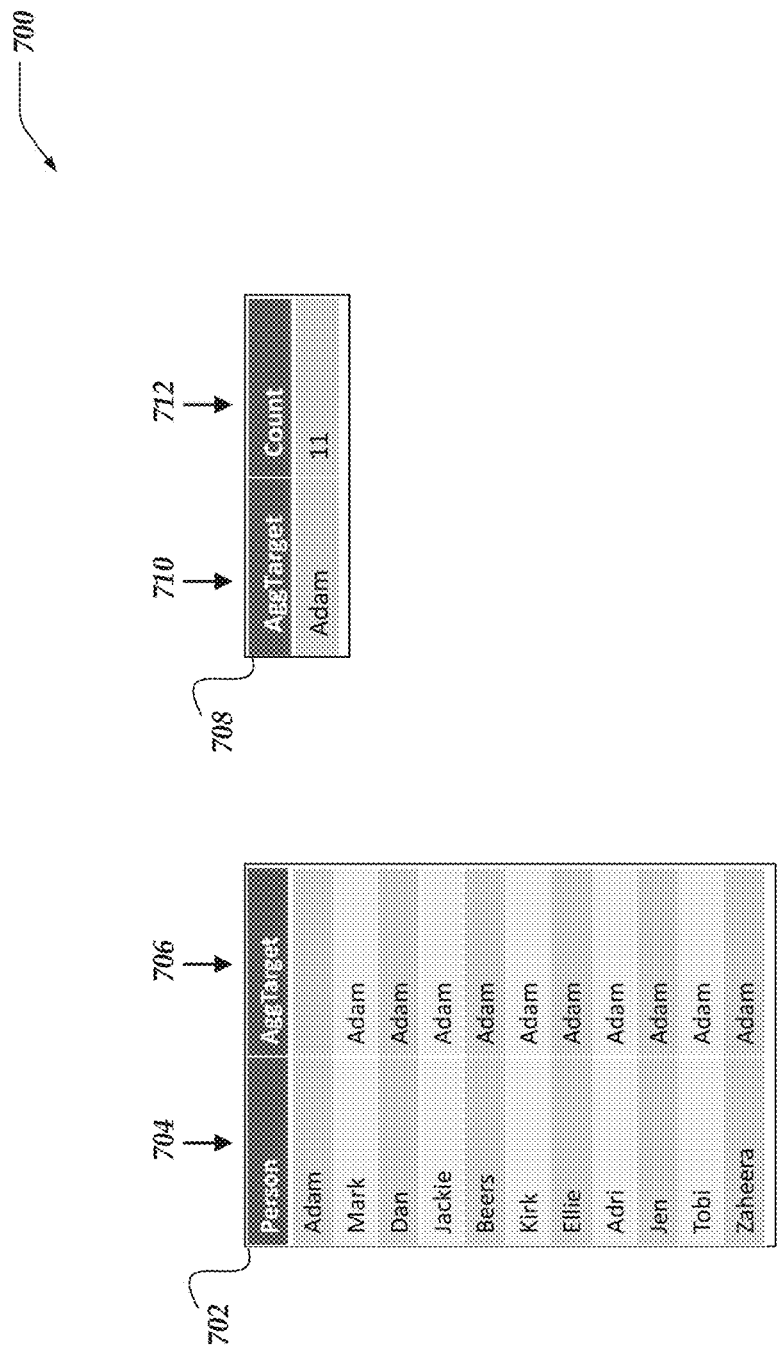
FIG. 7 illustrates a logical representation of a data structures for data processing for visualizing hierarchical data in accordance with one or more of the various embodiments.

FIG. 7 illustrates a logical representation of data structures 700 for data processing for visualizing hierarchical data in accordance with one or more of the various embodiments. For some embodiments, table 702 represents a temporary intermediate data structure that may be generated by visualization engines in response to some types of queries.

In one or more of the various embodiments, visualization engines may receive requests to determine one or more values or results for display in visualizations. In some embodiments, visualization models associated with visualizations may map various display features (e.g., lines, marks, field values, labels, colors, or the like) to values that may correspond to one or more data objects declared in data models. For example, if a visualization displays graph of sales revenue over time, a request may be provided to collect the data used to generate the graph. Further, in some embodiments, visualizations may enable additional processing of data comprising one or more operations on data from data sources to provide values for visualizations. For example, in some embodiments, the data provided for display may be subject to one or more of filtering, aggregating, or the like, depending on the particular design of a given visualization. Accordingly, for brevity and clarity, a query as referred to herein may be considered to represent the data structures, expressions, messages, or the like, that correspond to the one or more requests, filters, functions, aggregations, constants, or the like, used to obtain, determine, or format the values for display or application in visualizations. Note, in one or more of the various embodiments, query information may be provided as part of the definition of the visualization (e.g., visualization model) created by a visualization author or other users that may be interacting with visualizations.

In this example, visualization engines may be arranged to generate tables, such as, table 702 in response to receiving or processing queries that may be associated with a tree-view. In this example, a query related to the descendants of the tree node corresponding to employee Adam. (See, tree 500 or table 602). In some embodiments, one or more portions of the queries may be directly related to determine values associated with one or more hierarchical relationships between data objects in a data model.

In this example, for some embodiments, the visualization engine may be arranged to employ the tree-view specification associated with table 602 to generate table 702. In this example, for some embodiments, the modeling engine may be arranged to iterate over table 702 to identify each descendant node of the employee Adam node. Thus, in this example, because employee Adam is the root of the hierarchy, each other employee in the organization are descendants of employee Adam.

In one or more of the various embodiments, intermediate tables, such as, table 702 may be arranged to include one or more columns, such as, Person column 704, Aggregate Target column 706, or the like. Accordingly, in this example, column 704 may be populated with the employees of the organization. And, in this example, column 706 may be populated with employee Adam. In this example, each entry of employee Adam in column 706 represents that the corresponding employee is under employee Adam in the hierarchy. Thus, the first record in table 702, column 704 includes employee Adam and column 706 is empty because the tree node corresponding to employ Adam is not a descendant of itself. In contrast, the remaining records in table 702, include employees with employee Adam in Aggregate Target column 706 because employee Adam their ancestor in tree 500.

In one or more of the various embodiments, visualization engines may be arranged to employ intermediate tables, such as, table 702 to compute results for query expressions. In this example, table 708 represents a data structure representing results of a query expression requesting a count of the employees that are under employee Adam. Accordingly, in this example, visualization engines may be arranged to count the number records in table 702 that include employee Adam in the Aggregate Target column (column 706).

Note, one of ordinary skill in the art will appreciate that other aggregate query expressions beside summing/counting may be supported by data structures, such as, table 702. For example, in some embodiments, visualization engines may be arranged to employ tables such as table 702 to answer query expressions that may include conditionals (less than, greater than, or the like), means, medians, or the like. Also, in some embodiments, visualization engines may be arranged to employ more than one intermediate table to answer queries as needed.

Figure 8:
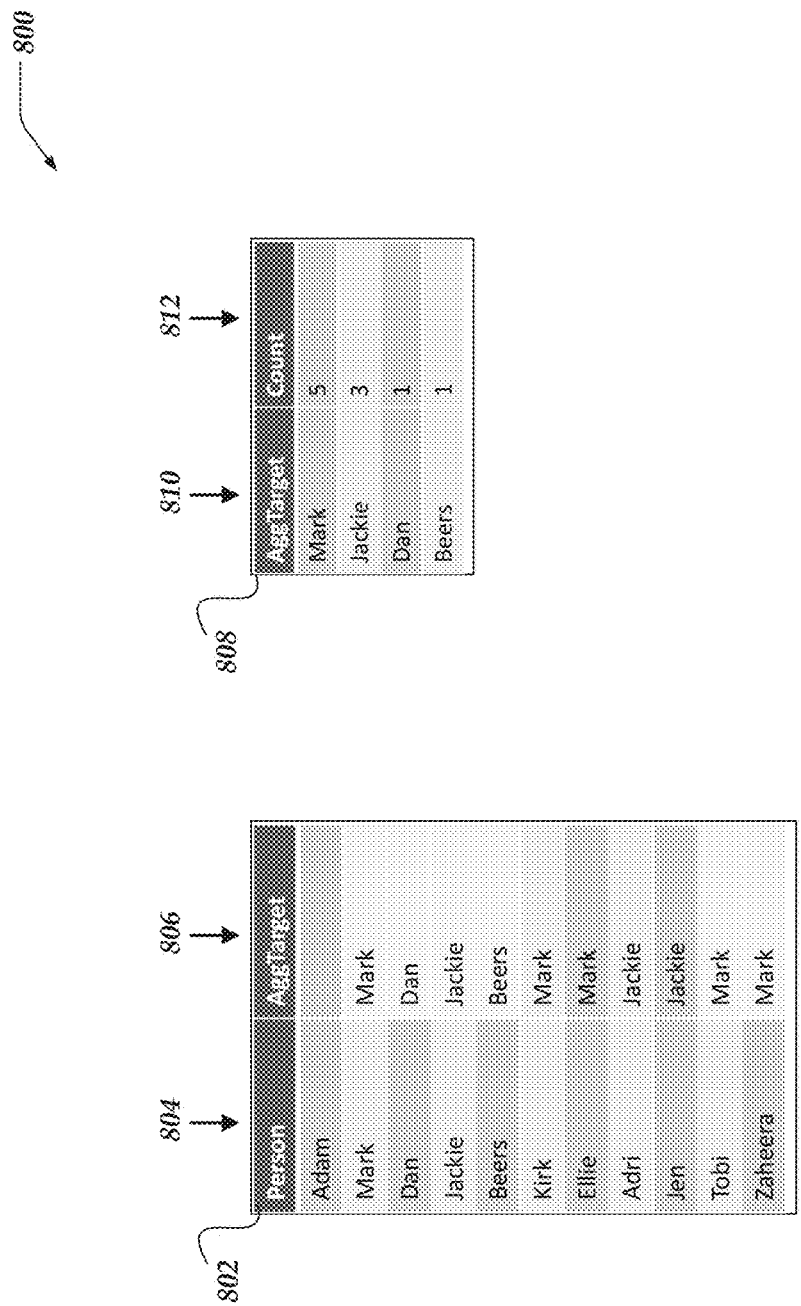
FIG. 8 illustrates a logical representation of a data structures for data processing for visualizing hierarchical data in accordance with one or more of the various embodiments.

FIG. 8 illustrates a logical representation of data structures 800 for data processing for visualizing hierarchical data in accordance with one or more of the various embodiments. In one or more of the various embodiments, visualization engines may be arranged to generate different intermediate tables depending on which query expressions a given visualization model may include. In this example, table 802 represents an intermediate table generated for answering query expressions related to employees in the second level of the organization as determined by tree 500.

Accordingly, in this example, visualization engines may be arranged to generate intermediate table 802 for computing the number of employees (if any) managed by the employees in the second level of the organization. Accordingly, in this example, column 804 includes each employee and column 806 lists the second level manager for each employee. In this example, the query may be considered to be inclusive in that the root node of (the second level employee) for second level tree-portion is included. For example, employee Mark is associated with an Aggregate Target value of Mark.

Similar to intermediate table 708, intermediate table 808 includes the results of the query expression. In this example, column 810 lists each aggregate target and column 812 lists the number of employees associated with the employee in the corresponding aggregate target. Another way of interpreting these results may be that the values in column 812 represent number of employees in a department or group that is managed by the employee listed in column 810.

Figure 9:
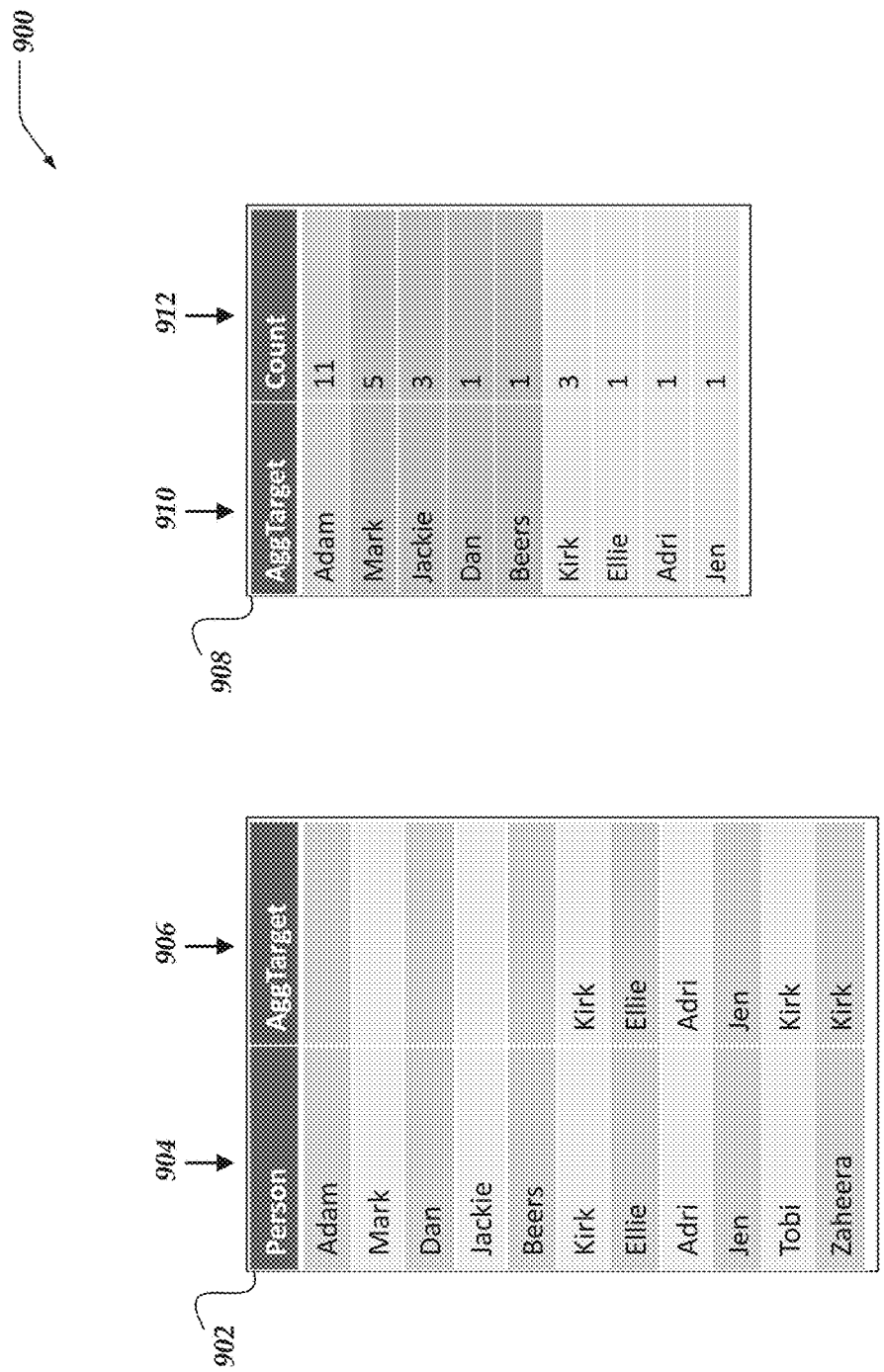
FIG. 9 illustrates a logical representation of a data structures for data processing for visualizing hierarchical data in accordance with one or more of the various embodiments.

FIG. 9 illustrates a logical representation of data structures 900 for data processing for visualizing hierarchical data in accordance with one or more of the various embodiments. In this example, intermediate table 902 and intermediate table 908 may be considered similar to intermediate tables described for FIG. 7 or FIG. 8 such that intermediate table 908 may be generated by combining intermediate table 708 and intermediate 808. Accordingly, for brevity and clarity discussion included above will not repeated here.

In this example, visualization engines may generate intermediate table 902 to provide results for queries related to the third level of the organization represented by tree 500.

Likewise, in this example, intermediate table 908 includes column 910 and column 912 that hold the results of the query. Here, it may be assumed that the queries are related to counting the number of employees included in departments that are led by employees at the third level of the organization. However, in this example, intermediate table 908 includes values for the first three levels of the organization rather than just a single level.

Figure 10:
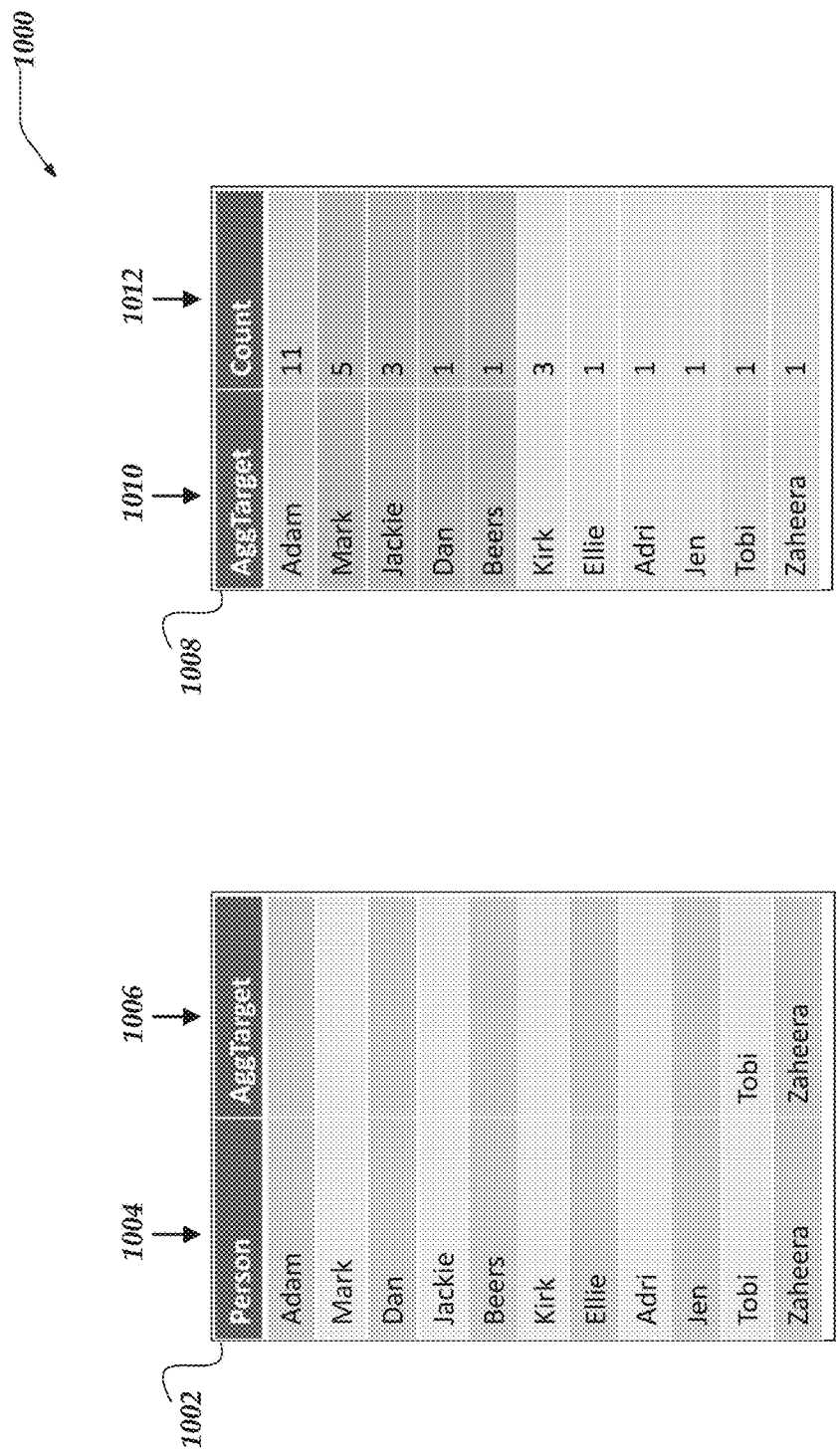
FIG. 10 illustrates a logical representation of a data structures for data processing for visualizing hierarchical data in accordance with one or more of the various embodiments.

FIG. 10 illustrates a logical representation of data structures 1000 for data processing for visualizing hierarchical data in accordance with one or more of the various embodiments. Similar to the intermediate tables described above for FIG. 9, visualization engines may be arranged to generate tables such as intermediate table 1002 or intermediate table 1010. Accordingly, in this example, intermediate table 1002 includes column 1004 for listing employees in the organization and column 1006 for listing aggregate targets that may be responsive query expressions. In this example, visualization engines may generate intermediate table 1002 in response to queries regarding the fourth level of the organization as per tree 500. Likewise, in this example, intermediate table 1008 may be considered a combination of intermediate table 708, intermediate table 808, and intermediate table 908 that lists aggregate targets in column 1010 and a count in column 1012.

In this example, the fourth level of the organization as per tree 500 includes two employees, neither managing other employees.

Figure 11:
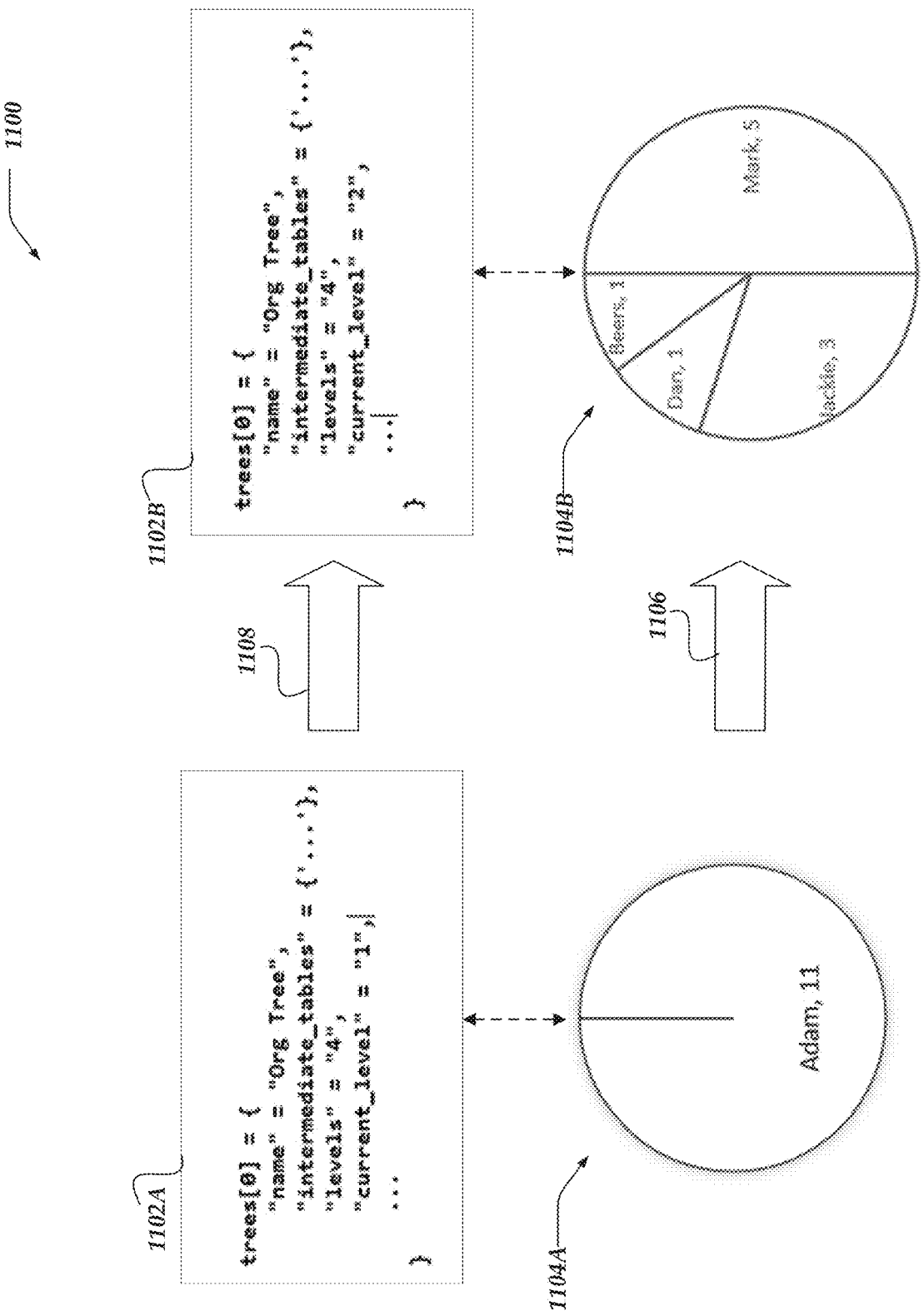
FIG. 11 illustrates a logical representation of a portion of a system for data processing for visualizing hierarchical data in accordance with one or more of the various embodiments.

FIG. 11 illustrates a logical representation of a portion of system 1100 for data processing for visualizing hierarchical data in accordance with one or more of the various embodiments. As described above, in some embodiments, visualization engines may be arranged to employ one or more data structures, such as, tree specifications, to track the state associated with tree views that may be included in a visualization. As mentioned, in some embodiments, visualization engines may be arranged to generate tree views in visualizations based on tree models that may be included in a data model. Typically, in some embodiments, tree models may be declared by visualization authors when the visualization is being authored. In contrast, tree specifications may be generated by visualization engines to support the display of tree views in visualizations that are presented to users. In this example, system 1100 illustrates how tree specifications may be employed by visualization engines to track information about tree views.

In this example, tree specification 1102A may represent data structures for tracking information about tree view 1104A as it may be displayed as part of a visualization. In this example, visualization 1104A is a pie chart showing the number of employees that report to Adam as determined based on tree 500, or the like. Accordingly, in this example, for some embodiments, tree specification 1102A includes information or meta-data that visualization engines may employ to manage tree view 1104A, including, tree view name, number of tree levels, a reference to one or more intermediate tables, the level currently displayed, or the like. Note, one of ordinary skill in the art will appreciate that the innovations disclosed herein anticipate that tree specifications may include more or less attributes than illustrated here. However, one of ordinary skill in the art will appreciate that the disclosure of tree specification 1102A/1102B are at least sufficient to disclose the innovations disclosed herein. Further, while tree specification 1102A/B are illustrated as being based on JSON-like data structures, other data structures are within the scope of these innovations. For example, in some embodiments, visualization engines may be arranged to employ tree specifications using various runtime data structures, including, lists, hash tables, C/C++ structures, XML, or the like. In some embodiments, visualization engines may be arranged to access or interact with tree specifications via APIs or libraries. Accordingly, in some embodiments, visualization engines may be arranged to employ configuration information to define or interact with tree specifications.

In this example, tree view 1104A may be arranged to enable users to drill-down through tree nodes at different levels of the tree. In this example, user interaction 1106 may include activating the visualization engine to re-render (e.g., visualization action 1108) the tree view based on a different location of the tree. In this example, a user may have clicked on an interactive user interface control to display tree view 1104B. In this example, tree view 1104A and tree view 1104B may provide a visualization of the same tree view at different locations in the tree. Accordingly, in this example, tree view 1104B represents a visualization that starts with the second level of the underlying tree. Thus, in this example, for some embodiments, tree specification 1102B shows the current level of the tree view is the second level.

Similarly, in some embodiments, if a user clicks on one of the pie chart wedges of tree view 1104B, the visualization engine may drill down to the next of the underlying tree (is there is one) and update the tree specification accordingly.

Figure 12:
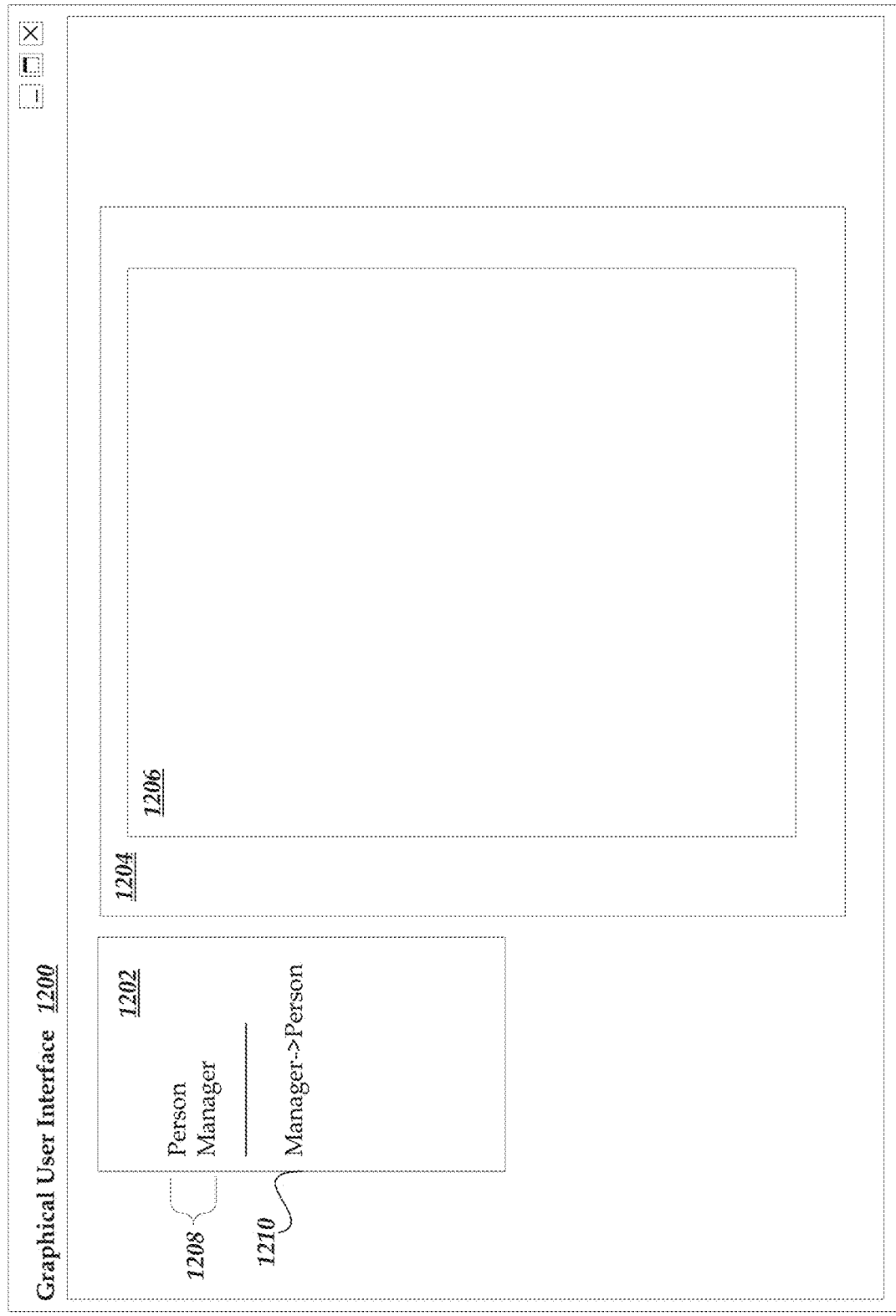
FIG. 12 illustrates a logical representation of a portion of a user interface for data processing for visualizing hierarchical data in accordance with one or more of the various embodiments.

FIG. 12 illustrates a logical representation of a portion of user interface 1200 for data processing for visualizing hierarchical data in accordance with one or more of the various embodiments. In some embodiments, user interface 1200 may be arranged to include one or more panels, such as, data panel 1202, display panel 1204, or the like.

In one or more of the various embodiments, user interface 1200 may be displayed on one or more hardware displays, such as, client computer displays, mobile device displays, or the like. In some embodiments, user interface 1200 may be provided via a native application or as a web application hosted in a web browser or other similar applications. One of ordinary skill in the art will appreciate that for at least clarity or brevity many details common to commercial/production user interfaces have been omitted from user interface 1200. Likewise, in some embodiments, user interfaces may be arranged differently than shown depending on local circumstances or local requirements. However, one of ordinary skill in the art will appreciate that the disclosure/description of user interface 1200 is at least sufficient for disclosing the innovations included herein.

In this example, data panel 1202 is employed to display portions of data sources or data models that may be available to include in a tree view. In this example, the listed items represent data fields or data objects that may be added to a specification information for a tree view. In some embodiments, the particular items shown in a data panel may be determined based on configuration information that that may identify portions of data sources or data models that may be available at given time.

In this example, display panel 1204 is employed to display one or more portions of a visualization of a based on a visualization model that may include one or more tree views.

Also, in this example, tree view 1206 may represent one or more charts, plots, or the like, that may be employed to visualize tree information or tree-like information. Note, tree view 1206 may be arranged to include various styling, marks, labels, values, or the like, based on the underlying visualization model, data model, user input, or the like.

In this example, data panel 1202 includes data objects 1208 representing objects or fields provided by a data model or data source. Further, in this example, relationship 1210 represents a portion of the tree-view specification that defines the relationships between data objects 1208. In this example, relationship 1210 may be considered to indicate that Manager objects are parents of Person objects.

Generalized Operations

Figure 13:
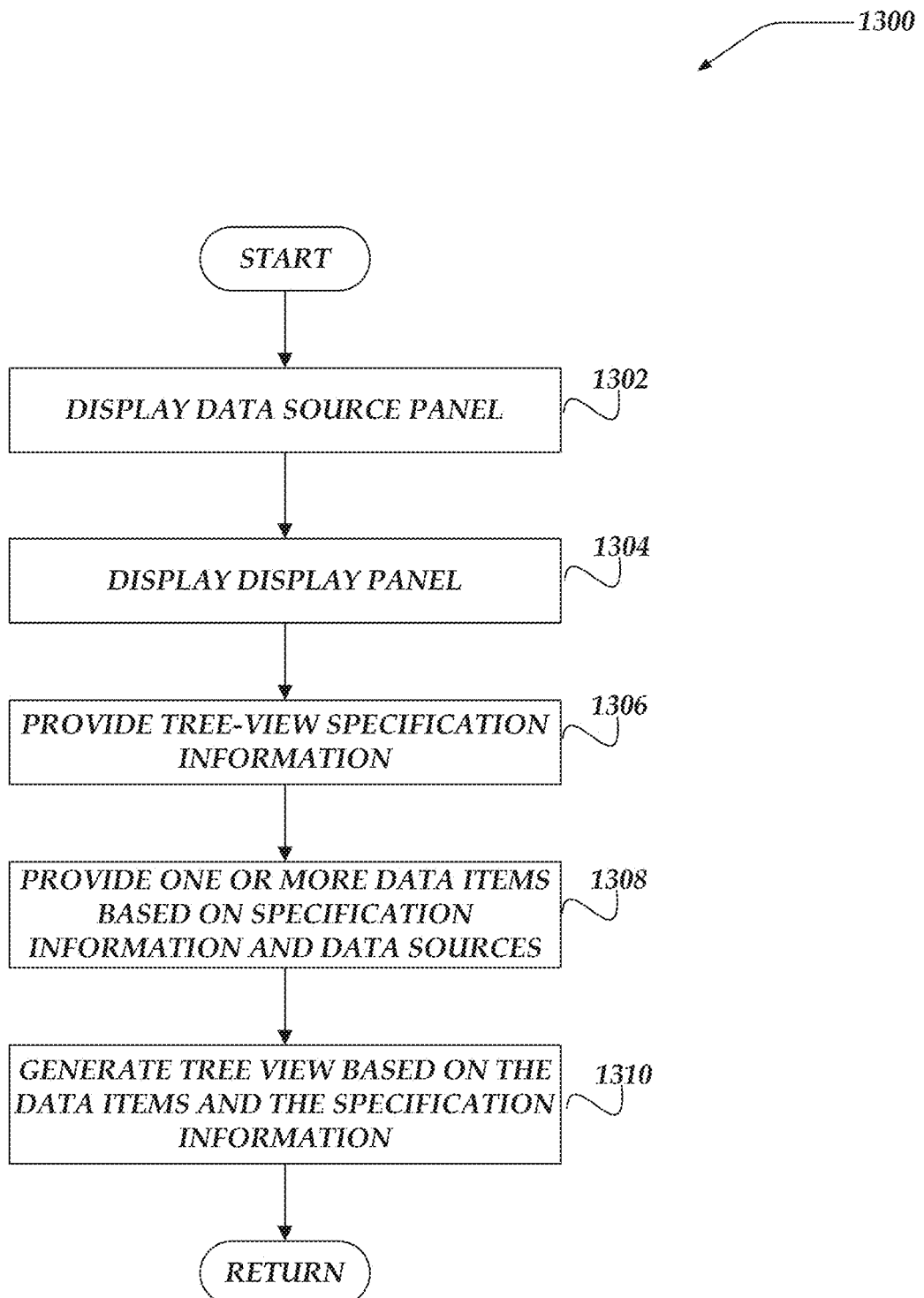
FIG. 13 illustrates an overview flowchart of a process for data processing for visualizing hierarchical data in accordance with one or more of the various embodiments.
Figure 14:
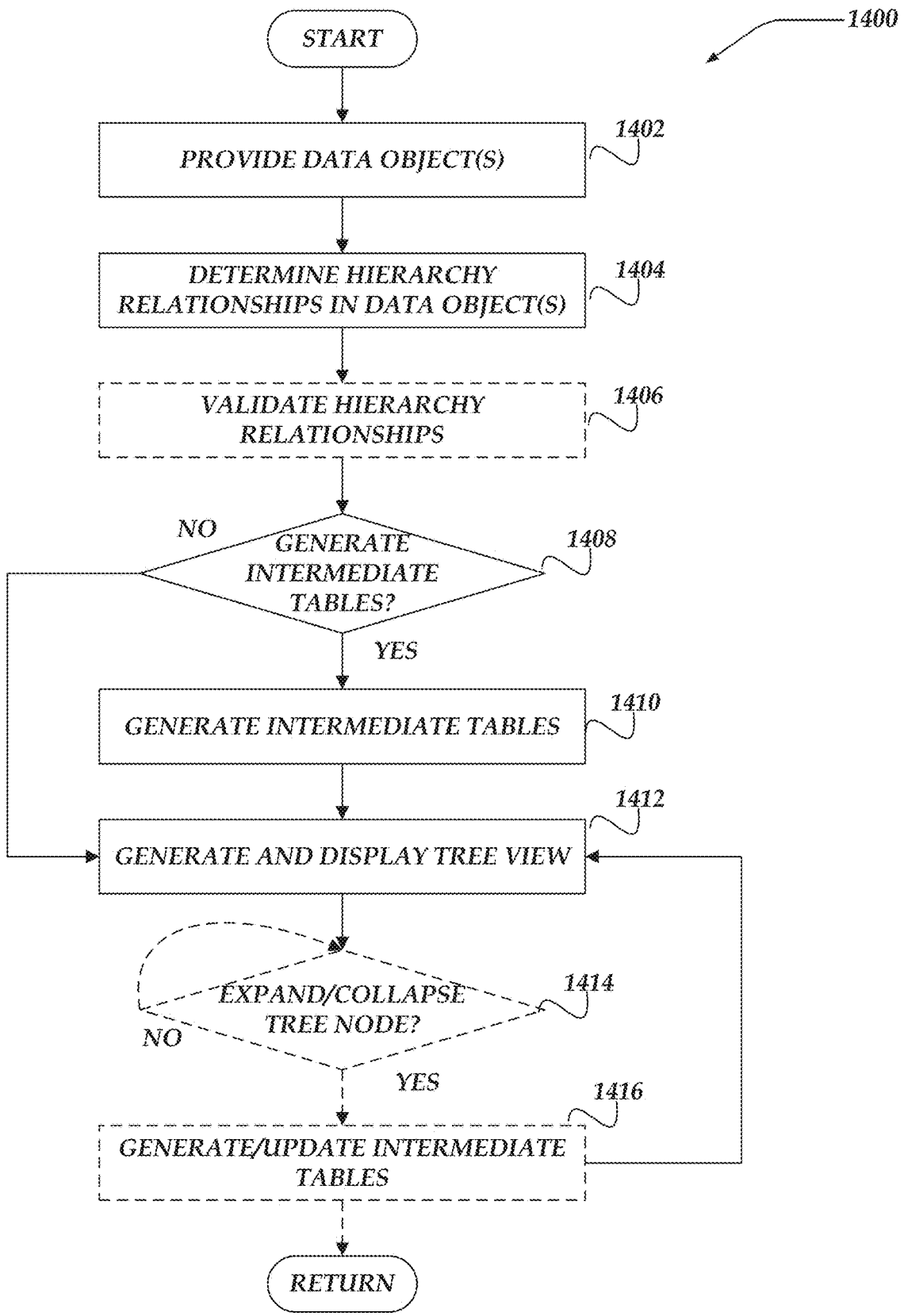
FIG. 14 illustrates a flowchart of a process for data processing for visualizing hierarchical data in accordance with one or more of the various embodiments.
Figure 15:
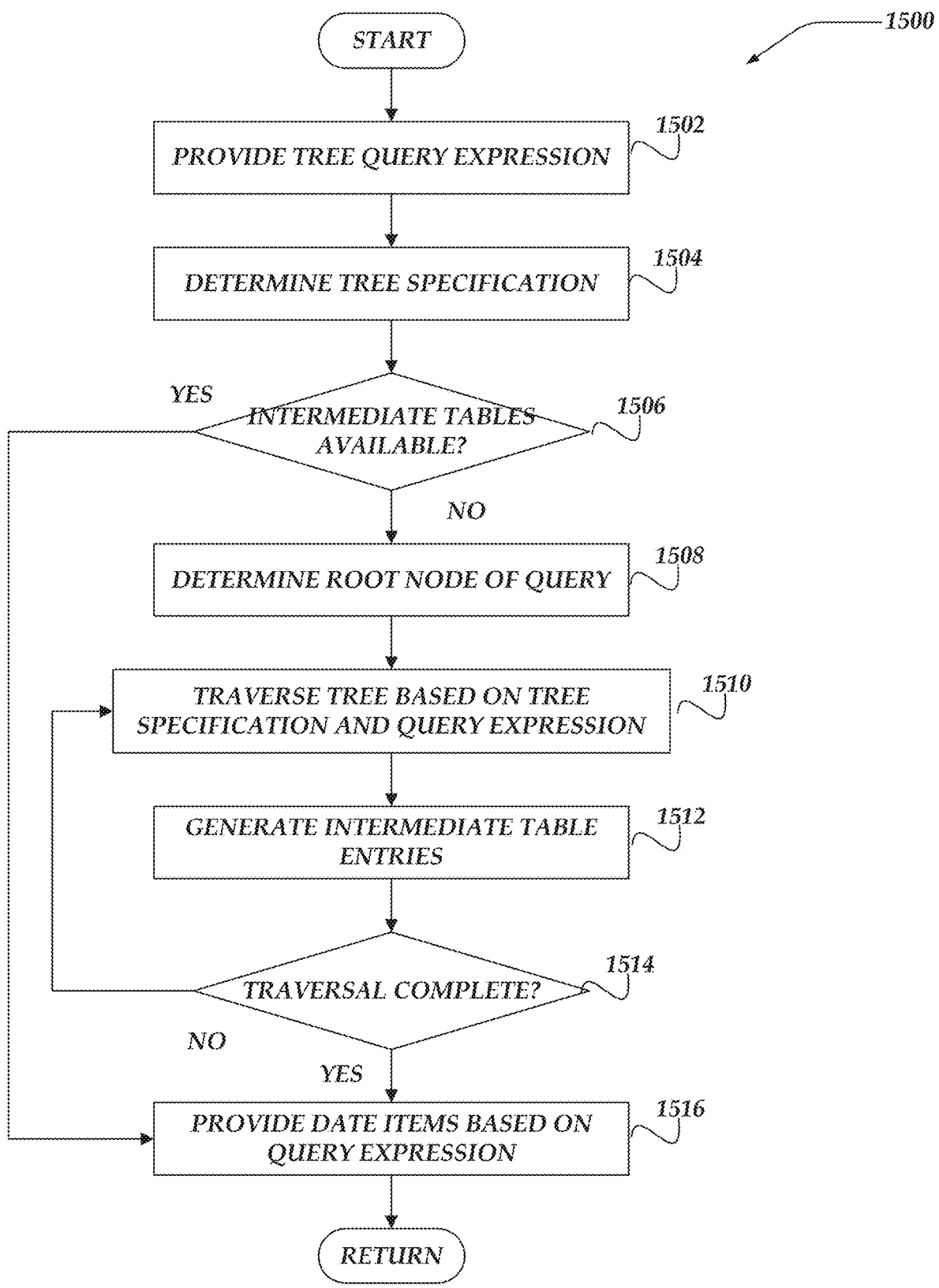
FIG. 15 illustrates a flowchart of a process for processing query expressions for data processing for visualizing hierarchical data in accordance with one or more of the various embodiments.

FIGS. 13-15 represent generalized operations for data processing for visualizing hierarchical data in accordance with one or more of the various embodiments. In one or more of the various embodiments, processes 1300, 1400, and 1500 described in conjunction with FIGS. 13-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 13-15 may be used for data processing for visualizing hierarchical data in accordance with at least one of the various embodiments or architectures such as those described in conjunction with FIGS. 4-12. Further, in one or more of the various embodiments, some or all of the actions performed by processes 1300, 1400, and 1500 may be executed in part by modeling engine 322 or visualization engine 324 running on one or more processors of one or more network computers.

FIG. 13 illustrates an overview flowchart of process 1300 for data processing for visualizing hierarchical data in accordance with one or more of the various embodiments. After a start block, at block 1302, in one or more of the various embodiments, a visualization engine may be arranged to display a data source panel. As described above, visualization engines may be arranged to generate one or more panels in an interactive user interface. The layout of the panels may vary depending on local requirements or configuration information. In some embodiments, one or more panels may be combined. Similarly, in some embodiments, one or more panels may be divided into two or more panels.

At block 1304, in one or more of the various embodiments, the visualization engine may be arranged to display a display panel. As described above, visualization engines may be arranged to employ display panels to display of interactive visualizations, such as, one or more tree-views or other types of views.

At block 1306, in one or more of the various embodiments, the visualization engine may be arranged to provide one or more tree-view specifications that may be employed to generate the visualizations of tree views. As described above, tree-view specifications may be based on hierarchical relationships determined from data models. In some cases, data models may include one or more tree models that expressly declare the data objects, relationships between one or more data objects, or the like, that may be available to include for tree specifications.

In some embodiments, if the underlying data model omits information (e.g., tree models) that describes the hierarchical relationships between objects, users may be prompted to provide the necessary information. Alternatively, in some embodiments, in some cases, visualization engines may be arranged to automatically infer one or more candidate hierarchical relationships between data objects based on the underlying data source or data model.

In some embodiments, the candidate hierarchical relationships may form the basis for an initial tree-view specification. In one or more of the various embodiments, tree views that may have been previously generated may be associated with tree-view specification information the was provided when the tree views were created. Accordingly, in some embodiments, visualization engines may be arranged to employ an identifier associated with a tree view to retrieve its tree-view specification from a data store. Further, in some embodiments, visualization models associated with visualizations being displayed in the display panel may be arranged to include or embed tree-view specification determined by authors of the visualization model.

In some embodiments, tree-view specifications may be unavailable for new tree views that authors may intend to add to a visualization. Accordingly, in some embodiments, visualization engines may be arranged to generate tree-view specifications for new tree views. In some embodiments, visualization engines may be arranged to employ templates or rules provided via configuration information to generate initial tree-view specifications for new tree views.

At block 1308, in one or more of the various embodiments, the visualization engine may be arranged to provide one or more data items based on the tree-view specification information and one or more data sources. As described above, in some embodiments, data items that may be employed to fill-out the tree view visualization. Note, in some embodiments, the particular data items or their arrangement in the visualization may vary depending on the visualization models, tree-view specifications, queries, filters, or the like, that may be provided. For example, intermediate table 1008 shown in FIG. 10 may be considered representative of the one or more data items that may be employed in a tree view visualization.

At block 1310, in one or more of the various embodiments, the visualization engine may be arranged to generate a tree view based on the data items and the tree-view specification information. In one or more of the various embodiments, visualization engines may be arranged to interpret the tree-view specification and visualization model to generate the visualization objects that may be included in the tree view.

Next, in one or more of the various embodiments, control may be returned to a calling process.

FIG. 14 illustrates a flowchart of process 1400 for data processing for visualizing hierarchical data in accordance with one or more of the various embodiments. After a start block, at block 1402, in one or more of the various embodiments, a visualization engine be provided one or more data objects. As described above, visualization models may be associated with one or more data models that visualization engines may employ to retrieve values from one or more underlying data sources. For example, as described above Employees, Managers, or the like, may be considered data objects.

However, one of ordinary skill in the art will appreciate that the number or type of data objects may vary depending on the particular data source, data models, or the like, that may be associated with visualizations. In practice, for some embodiments, there may be more or fewer data objects, some or all of which may be associated with tree views or tree-view specifications.

At block 1404, in one or more of the various embodiments, the visualization engine may be arranged to determine one or more hierarchical relationships between the one or more data objects. In one or more of the various embodiments, hierarchical relationships between or among some or all of the data objects may be defined in one or more tree-view specifications. Likewise, in some embodiments, visualization platforms may be arranged to provide interactive user interfaces that enable users or visualization authors to dynamically identify or define one or more relationships between one or more data objects to generate tree-view specifications on-the-fly.

At block 1406, in one or more of the various embodiments, optionally, the visualization engine may be arranged to validate the one or more determined hierarchical relationships. In one or more of the various embodiments, visualization engines may be arranged to enforce one or more rules that validate or confirm that the one or more data objects or the one or more relationships may be consistent with one or more constraints or properties required for defining trees or tree views.

In one or more of the various embodiments, visualization engines may be arranged to evaluate if the one or more data objects or the one or more relationship break one or more conventional constraints or properties of trees defined by graph theory. For example, in some embodiments, visualization engines may be arranged to reject attempts to define tree views that result in graphs that include cycles, and so on. However, in some embodiments, visualization engines may be arranged to disregard one or more constraints or properties associated with formal graph theory definitions of trees. Accordingly, in some embodiments, visualization engines may be arranged to employ one or more rules from configuration information to determine the particular constraints or properties that may be enforced for tree views.

Note, this block is marked as being optional because modeling engines or visualization engines may be arranged to automatically disable users or visualization authors from defining tree views that may be in conflict with constraints or properties of trees enforced by the modeling engines or visualization engines.

At decision block 1408, in one or more of the various embodiments, if the visualization model associated with the data objects requires one or more intermediate tables, the control may flow to block 1410; otherwise, control may flow to block 1412. In some embodiments, visualization models may include one or more features (e.g., tree views, summary tables, display values, or the like) that may indicate that intermediate tables should be generated. In other cases, for some embodiments, users may interact with one or more controls or features of interactive visualizations that trigger the requirement for one or more intermediate tables.

At block 1410, in one or more of the various embodiments, the visualization engine may be arranged to generate one or more intermediate tables. As described above, visualization engines may be arranged to evaluate the one or more data objects or the one or more relationships to determine the one or more intermediate tables that may be generated.

At block 1412, in one or more of the various embodiments, the visualization engine may be arranged to generate and display one or more tree views. As described above, visualization engines may be arranged to employ the one or more intermediate tables to generate information for displaying in a tree view. Note, in some embodiments, tree views are not required to have a tree-like visual appearance. In some embodiments, tree views may be considered views that include information based on a tree-like structure of the underlying data and tree-view specification rather having to appear conventionally tree like. For example, in some embodiments, a visualization that displays a sorted list of employees based on the number of employees they manage may appear to be a conventional list. However, in some embodiments, one or more of the values displayed in the list may be generated based on one or more intermediate tables associated with tree-view specifications, or the like.

At decision block 1414, in one or more of the various embodiments, optionally if one or more nodes in the tree view are expanded or collapsed, control may flow to block 1416; otherwise, control may loop back to decision block 1414.

In one or more of the various embodiments, visualizations that include tree views may be configured to have one or more interactive features that enables users/viewers to expand or collapse portions of the tree view to drill down or drill up to different levels of the tree views.

In one or more of the various embodiments, the particular form or format of the interactive controls or interactive user interface may depend on the particular visualization models or tree-view specifications involved in the visualizations.

Note, in one or more of the various embodiments, visualizations that include tree views may include visualizations that include conventional or traditional tree-like components, such as, nodes, leaves, edges, or the like. However, one of ordinary skill in the art will appreciate that the innovations disclosed herein are not so limited. Accordingly, in some cases, for some embodiments, the visualizations may display visualization objects, such as, bar charts, pie charts, or the like, that display data items from the intermediate aggregate tables that may not appear "tree-like" to an observer. Thus, in some embodiments, expanding or collapsing tree nodes may not appear tree-like to an observer even though the data items being displayed may be determined based on hierarchical relationships defined in tree-view specifications associated with the tree views.

In some embodiments, visualization engines may be arranged to employ tree-view specifications to store state information associated with interactive tree views. In some embodiments, this may include status information related to various tree-like characteristics, such as, expanded nodes, collapsed nodes, root node, node-in-focus, position in tree, or the like.

Note, this decision block is marked as being optional because some visualizations may not include interactive controls or user interface that enable tree nodes to be expanded or collapsed.

At block 1416, in one or more of the various embodiments, optionally, the visualization engine may be arranged to generate or update one or more intermediate tables in response to the one or more expanded or collapsed nodes.

In one or more of the various embodiments, visualization engines may generate one or more intermediate tables as described above to generate the data items for displaying in the visualization. In some embodiments, visualization engine may be arranged to store the generated in volatile storage that may persist during a user session or other limited time period. In some embodiments, one or more intermediate tables may be generated as they are needed. For example, as users or author submit query information, additional intermediate tables may be required. In some embodiments, in some cases, one or more intermediate tables may be discarded if data items associated with the one or more intermediate tables may not be visible in the visualization. In some embodiments, visualization engines may be arranged to employ rules, conditions, threshold values, or the like, provided via configuration information to determine if one or more intermediate tables should be kept or discarded.

In some embodiments, intermediate tables may be associated with or included in the tree-view specifications associated with displayed tree views. In some embodiments, tree-view specification data structures may be arranged embed intermediate tables. Alternatively, in some embodiments, tree-view specification data structures may be arranged include a reference or pointer to intermediate tables.

Note, this block is indicated as being optional because in some embodiments the necessary intermediate tables may be generated when the tree view is initialized and displayed. Also, in some cases, the intermediate tables associated with the expand/collapse actions may have been on behalf of a previous interaction.

Next, in one or more of the various embodiments, control may be returned to a calling process.

FIG. 15 illustrates a flowchart of process 1500 for processing query expressions for data processing for visualizing hierarchical data in accordance with one or more of the various embodiments. After a start block, at block 1502, in one or more of the various embodiments, a tree query expression may be provided to a visualization engine. In one or more of the various embodiments, tree query expressions may be considered query expressions that presume or rely on the presence of tree-views in a visualization. In some embodiments, the data model or visualization model may include fields, marks, plots, graphs, or the like, that may be associated with tree-views or tree-view specifications.

In one or more of the various embodiments, tree query expressions may be triggered based on user interactions with tree views. For example, if users take actions to expand or collapse nodes of the underlying tree, tree query expressions may be generated to determine the appropriate values to employ in the visualization.

Also, in some embodiments, visualization platforms may provide user interfaces that enable users to interactively provide tree query expressions. Note, in some embodiments, tree query expressions may be considered otherwise conventional expressions that are directed to data arranged or viewed as a tree. In one or more of the various embodiments, visualization platforms may support a defined number or tree query expressions or tree query expressions types (e.g., aggregates, or the like). In some embodiments, visualization engines may be arranged to determine the one or more supported tree query expression types based on rules, instructions, libraries, or the like, provided via configuration information to account for local requirements or local circumstances. For example, in some embodiments, visualization platforms may be arranged to enable users or visualization authors to provide scripts or libraries that extend the various tree query expressions that may be supported.

In some embodiments, if tree-views are included in a visualization, visualization platforms may be arranged to provide user interfaces that automatically enable tree-view features (e.g., enabling tree query expressions). Likewise, in some embodiments, absent tree-views in a visualization, visualization platforms may be arranged to disable features that enable tree query expressions.

At block 1504, in one or more of the various embodiments, visualization engines may be arranged to determine a tree-view specification associated with a data model associated with a visualization. In some embodiments, visualization models or data models that support tree query expressions may be associated with one or more tree-view specifications that define one or more features of included/displayed tree-views.

At decision block 1506, in one or more of the various embodiments, if the necessary intermediate tables may be available, control may flow to block 1516; otherwise, control may flow to block 1508. As described above, in some embodiments, visualization engines may be arranged to employ one or more intermediate tables to provide results for tree query expressions. In some embodiments, intermediate tables associated with a tree view may be included in or referenced by the tree-view specifications that correspond to the tree view.

In one or more of the various embodiments, visualization engines may be arranged to reuse one or more relevant intermediate tables if they may be available. For example, in some embodiments, one or more intermediate tables may be generated when the tree view is initially displayed or otherwise selected for display. Accordingly, in some embodiments, visualization engines may be arranged to maintain intermediate tables in volatile memory, such as, RAM or temporary caches for the duration of a user session. Also, in some embodiments, intermediate tables may be discarded if the underlying data sources, data models, tree-view specifications, or the like, are modified during a pending session.

In some embodiments, visualization engines may be arranged to persist intermediate tables beyond the duration of user sessions. For example, in some embodiments, visualization engines may be arranged to persist intermediate tables beyond the length of session if the underlying data model includes static data and relationships.

At block 1508, in one or more of the various embodiments, visualization engines may be arranged to determine one or more root nodes associated with the query expression. In one or more of the various embodiments, visualization engines may be arranged to determine a root node based on one or more data objects or relationships included (or implicated) by the tree query expression. In some embodiments, visualization engines may be arranged to employ tree-view specifications to determine relationships between objects that may be employed to identify a root node of the portion of the tree-view corresponding to the tree query expression. In some embodiments, a tree query expression may explicitly identify a root node. For example, for some embodiments, visualization engines may provide interactive visualizations that enable users to select displayed objects such that the selected object is provided a root node for a tree query expression. In other cases, for some embodiments, query expressions may be described in terms of relationships, such as, Manager→Employee rather than including identified object instances or data items.

At block 1510, in one or more of the various embodiments, visualization engines may be arranged to traverse the tree based on the tree-view specification and the query expression. As described above, for some embodiments, tree-view specifications may include the definitions or declarations of one or more relationships between one or more data objects that may provide a tree or tree-like representation. Accordingly, in some embodiments, visualization engines may be arranged to apply the relevant tree-view specifications to determine the relevant portions of the tree to traverse in response to tree query expressions.

At block 1512, in one or more of the various embodiments, visualization engines may be arranged to generate one or more intermediate tables based on the traversal. In some embodiments, visualization engines may be arranged to accumulate results for tree query expressions as nodes in the relevant tree portions may be visited by the traversal. In one or more of the various embodiments, the specific operations performed for each node may depend in the particular tree query expression being processed. For example, for some embodiments, if the tree query expression may request a total sum of the employees reporting to a manager, the visualization engine count each visited node. In other examples, the tree query expression may include addition terms that may include or exclude one or more visited nodes from inclusion in the query results. For example, for some embodiments, if the query is arranged to count the number of local employees reporting to a manager, a filter expression that excludes or includes employees from the results based on geographical location may be applied to influence the results.

At decision block 1515, in one or more of the various embodiments, if the traversal of the tree may be complete, control may flow to block 1516; otherwise, control may loop back to block 1510 to continue traversing the tree portion.

As described above, in one or more of the various embodiments, visualization engines may update one or more intermediate tables as the traversal of the one or more tree portions progresses.

At block 1516, in one or more of the various embodiments, visualization engines may be arranged to provide one or more data items based on the query expression and the intermediate tables. As described above, in one or more of the various embodiments, visualization engines may be arranged to employ the one or more intermediate tables to provide one or more data items in response to the tree query expression. In one or more of the various embodiments, visualization engines may be arranged to employ some or all of the data items in the visualization. Note, one or more data items may be excluded from display (or other consideration) depending on filters, rules, or the like, included in the visualization model.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for generating visualizations of data using one or more processors that execute instructions to perform actions, comprising:
    providing a data model and a tree specification, wherein the tree specification declares one or more parent-child relationships between two or more objects in the data model;
    validating a hierarchy of the one or more parent-child relationships in a tree model as having characteristics that are consistent for one or more separately required constraints that define one or more trees of the tree model, wherein the one or more separately required constraints are disregarded for at least a portion of the tree model, wherein the tree model is automatically generated based on one or more of the tree specification or an input from a user;
    determining a tree of the tree model based on the one or more parent-child relationships that includes one or more parent objects and one or more child objects from the one or more objects based on the one or more parent-child relationships;
    determining one or more root objects based on the tree, wherein the one or more root objects are parent objects that correspond to a root node of one or more portions of the tree;
    traversing the tree from the one or more root objects to visit the one or more child objects in the one or more portions of the tree;
    determining one or more partial results based on one or more characteristics of the one or more visited child objects, wherein the one or more partial results are aggregated and stored in an intermediate table;
    in response to a query associated with one or more objects in the data model, providing a response to the query that includes one or more values based on the intermediate table and the one or more partial results; and
    displaying a tree view in a visualization of one of a plurality of levels of the tree in a user interface, wherein a selection of another one of the plurality levels in the tree view visualization causes display of another tree view visualization for the other selected level in the user interface, and wherein the tree specification is updated based on the displayed another visualization of the tree view, wherein the visualization maintains visual state consistency by tracking expanded and collapsed nodes in a state table that preserves display state during tree updates, and wherein user interface controls are dynamically enabled and disabled based on validation rules applicable to a currently displayed hierarchical level.

2. The method of claim 1, wherein aggregating and storing the one or more partial results in the intermediate table further comprises:
    determining one or more values for each parent object and each child object based on the one or more characteristics of the one or more visited child objects; and
    storing one or more records in the intermediate table, wherein each record includes an identifier that corresponds to a parent object or a child object and a value that corresponds to a partial result.

3. The method of claim 1, wherein the tree model is generated from a data source that includes a plurality of records of information arranged in one or more tables.

4. The method claim 1, wherein determining the tree, further comprises, determining one or more nodes and one or more edges based on the data model and the one or more parent-child relationships, wherein the one or more nodes of the tree correspond to the one or more parent objects or the one or more child objects, and wherein the one or more edges of the tree correspond to the one or more parent-child relationships.

5. The method of claim 1, further comprising:
displaying the tree view based on the one or more values included in the response to the query; and
in response to one or more user interactions that expand or collapse a node in the tree view that corresponds to a parent object, performing further actions, including:
updating the query based on the expanded or collapsed node;
generating one or more other partial results based on updated query;
updating the intermediate table based on the one or more partial results;
generating another response to the query that includes one or more other values based on the updated query and the updated intermediate table; and
updating the displayed tree view based on the one or more other values.

6. The method of claim 1, further comprising:
generating a graphical user interface (GUI) that includes a data panel, a display panel, and the tree view;
employing the data panel to display one or more portions of a data source or the data model that are available to include in the tree view; and
employing the tree view to display one or more charts or plots for visualizing the tree.

7. The method of claim 1, further comprising:
displaying the tree view for visualizing the tree, wherein one or more user inputs may be provided through the tree view;
updating an appearance of the tree view based on the one or more user inputs; and
updating the tree specification based on a current state of the tree view.

8. A processor readable non-transitory storage media that includes instructions for generating visualizations of data, wherein execution of the instructions, by one or more processors, are configured to cause performance of actions, comprising:
providing a data model and a tree specification, wherein the tree specification declares one or more parent-child relationships between two or more objects in the data model;
validating a hierarchy of the one or more parent-child relationships in a tree model as having characteristics that are consistent for one or more separately required constraints that define one or more trees of the tree model, wherein the one or more separately required constraints are disregarded for at least a portion of the tree model, wherein the tree model is automatically generated based on one or more of the tree specification or an input from a user;
determining a tree of the tree model based on the one or more parent-child relationships that includes one or more parent objects and one or more child objects from the one or more objects based on the one or more parent-child relationships;
determining one or more root objects based on the tree, wherein the one or more root objects are parent objects that correspond to a root node of one or more portions of the tree;
traversing the tree from the one or more root objects to visit the one or more child objects in the one or more portions of the tree;
determining one or more partial results based on one or more characteristics of the one or more visited child objects, wherein the one or more partial results are aggregated and stored in an intermediate table;
in response to a query associated with one or more objects in the data model, providing a response to the query that includes one or more values based on the intermediate table and the one or more partial results; and
displaying a tree view in a visualization of one of a plurality of levels of the tree in a user interface, wherein a selection of another one of the plurality levels in the tree view visualization causes display of another tree view visualization for the other selected level in the user interface, and wherein the tree specification is updated based on the displayed another visualization of the tree view, wherein the visualization maintains visual state consistency by tracking expanded and collapsed nodes in a state table that preserves display state during tree updates, and wherein user interface controls are dynamically enabled and disabled based on validation rules applicable to a currently displayed hierarchical level.

9. The media of claim 8, wherein storing the one or more partial results in the intermediate table further comprises:
determining one or more values for each parent object and each child object associated with the query based on the one or more characteristics of the one or more visited child objects and the query; and
storing one or more records in the intermediate table, wherein each record includes an identifier that corresponds to parent object or a child object and a value that corresponds to a partial result.

10. The media of claim 8, wherein the tree model is generated from a data source that includes a plurality of records of information arranged in one or more tables.

11. The media of claim 8, wherein determining the tree, further comprises, determining one or more nodes and one or more edges based on the data model and the one or more parent-child relationships, wherein the one or more nodes of the tree correspond to the one or more parent objects or the one or more child objects, and wherein the one or more edges of the tree correspond to the one or more parent-child relationships.

12. The media of claim 8, further comprising:
displaying the tree view based on the one or more values included in the response to the query; and
in response to one or more user interactions that expand or collapse a node in the tree view that corresponds to a parent object, performing further actions, including:
updating the query based on the expanded or collapsed node;
generating one or more other partial results based on updated query;
updating the intermediate table based on the one or more partial results;
generating another response to the query that includes one or more other values based on the updated query and the updated intermediate table; and
updating the displayed tree view based on the one or more other values.

13. The media of claim 8, further comprising:
generating a graphical user interface (GUI) that includes a data panel, a display panel, and the tree view;

employing the data panel to display one or more portions of a data source or the data model that are available to include in the tree view; and employing the tree view to display one or more charts or plots for visualizing the tree.

14. The media of claim 8, further comprising:

displaying the tree view for visualizing the tree, wherein one or more user inputs may be provided through the tree view;

updating an appearance of the tree view based on the one or more user inputs; and updating the tree specification based on a current state of a tree view.

15. A system for generating visualizations of data, comprising:

a network computer, comprising:

a memory that stores at least instructions; and one or more processors that execute instructions that are configured to cause performance of actions, including:

providing a data model and a tree specification, wherein the tree specification declares one or more parent-child relationships between two or more objects in the data model;

validating a hierarchy of the one or more parent-child relationships in a tree model as having characteristics that are consistent for one or more separately required constraints that define one or more trees of the tree model, wherein the one or more separately required constraints are disregarded for at least a portion of the tree model, wherein the tree model is automatically generated based on one or more of the tree specification or an input from a user;

determining a tree of the tree model based on the one or more parent-child relationships that includes one or more parent objects and one or more child objects from the one or more objects based on the one or more parent-child relationships;

employing the one or more parent-child relationships to determine a tree that includes one or more parent objects and one or more child objects from the one or more objects based on the one or more parent-child relationships;

traversing the tree from the one or more root objects to visit the one or more child objects in the one or more portions of the tree;

determining one or more partial results based on one or more characteristics of the one or more visited child objects, wherein the one or more partial results are aggregated and stored in an intermediate table;

in response to a query associated with one or more objects in the data model, providing a response to the query that includes one or more values based on the intermediate table and the one or more partial results; and displaying a tree view in a visualization of one of a plurality of levels of the tree in a user interface, wherein a selection of another one of the plurality levels in the tree view visualization causes display of another tree view visualization for the other selected level in the user interface, and wherein the tree specification is updated based on the displayed another visualization of the tree view, wherein the visualization maintains visual state consistency by tracking expanded and collapsed nodes in a state table that preserves display state during tree updates, and wherein user interface controls are dynamically enabled and disabled based on validation rules applicable to a currently displayed hierarchical level; and a client computer, comprising:

a memory that stores at least instructions; and one or more processors that execute instructions that are configured to cause performance of actions, including:

providing the query or displaying the response to the query.

16. The system of claim 15, wherein storing the one or more partial results in the intermediate table further comprises:

determining one or more values for each parent object and each child object associated with the query based on the one or more characteristics of the one or more visited child objects and the query;

generating one or more records for each parent object and each child object associated with the query, wherein each record includes an identifier that corresponds to parent object or a child object and a value that corresponds to a partial result; and storing one or more records in the intermediate table, wherein each record includes an identifier that corresponds to parent object or a child object and a value that corresponds to a partial result.

17. The system of claim 15, wherein the tree model is generated from a data source that includes a plurality of records of information arranged in one or more tables.

18. The system of claim 15, wherein determining the tree, further comprises, determining one or more nodes and one or more edges based on the data model and the one or more parent-child relationships, wherein the one or more nodes of the tree correspond to the one or more parent objects or the one or more child objects, and wherein the one or more edges of the tree correspond to the one or more parent-child relationships.

19. The system of claim 15, wherein the one or more processors of the network computer execute instructions that perform actions, further comprising:

displaying the tree view based on the one or more values included in the response to the query; and in response to one or more user interactions that expand or collapse a node in the tree view that corresponds to a parent object, performing further actions, including:

updating the query based on the expanded or collapsed node;

generating one or more other partial results based on updated query;

updating the intermediate table based on the one or more partial results;

generating another response to the query that includes one or more other values based on the updated query and the updated intermediate table; and updating the displayed tree view based on the one or more other values.

20. The system of claim 15, wherein the one or more processors of the network computer execute instructions that perform actions, further comprising:

generating a graphical user interface (GUI) that includes a data panel, a display panel, and the tree view;

employing the data panel to display one or more portions of a data source or the data model that are available to include in the tree view; and employing the tree view to display one or more charts or plots for visualizing the tree.

* * * * *